(12) United States Patent
Hagen et al.

(10) Patent No.: US 10,807,627 B2
(45) Date of Patent: Oct. 20, 2020

(54) PHYSICAL SHOPPING CART HAVING FEATURES FOR USE IN CUSTOMER CHECKOUT OF ITEMS PLACED INTO THE SHOPPING CART

(71) Applicant: Target Brands, Inc., Minneapolis, MN (US)

(72) Inventors: Todd A. Hagen, Shakopee, MN (US); Andrew Wipf, Minneapolis, MN (US); Josh Michael Dingman, Minneapolis, MN (US); Donnie Tolbert, Minneapolis, MN (US); Donald John Armstrong, Carver, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 16/714,647

(22) Filed: Dec. 13, 2019

(65) Prior Publication Data

US 2020/0198680 A1 Jun. 25, 2020

Related U.S. Application Data

(60) Provisional application No. 62/784,162, filed on Dec. 21, 2018.

(51) Int. Cl.
| | |
|---|---|
| *G06K 15/00* | (2006.01) |
| *B62B 5/00* | (2006.01) |
| *G06Q 30/06* | (2012.01) |
| *G06Q 20/20* | (2012.01) |
| *H04W 4/80* | (2018.01) |
| *H04B 5/00* | (2006.01) |

(52) U.S. Cl.
CPC ......... *B62B 5/0096* (2013.01); *G06Q 20/208* (2013.01); *G06Q 30/0623* (2013.01); *G06Q 30/0633* (2013.01); *G06Q 30/0639* (2013.01); *H04B 5/0062* (2013.01); *H04W 4/80* (2018.02)

(58) Field of Classification Search
CPC .......... G06K 7/10376; G06K 7/10386; G06K 7/10772; G06K 9/22
USPC ..... 235/472.01, 462.45, 462.46, 472.02, 383
See application file for complete search history.

(56) References Cited

U.S. PATENT DOCUMENTS

| | | |
|---|---|---|
| 4,071,740 A | 1/1978 | Gogulski |
| 5,361,871 A | 11/1994 | Gupta et al. |

(Continued)

OTHER PUBLICATIONS

Geekwire.com [online], "How 'Amazon Go' works: The technology behind the online retailer's groundbreaking new grocery store," Dec. 5, 2016, [retrieved on Jul. 20, 2017], retrieved from : URL <https://www.geekwire.com/2016/amazon-go-works-technology-behind-online-retailers-gro>, 10 pages.

(Continued)

*Primary Examiner* — Daniel St Cyr
(74) *Attorney, Agent, or Firm* — Fish & Richardson P.C.

(57) ABSTRACT

A physical shopping cart comprises a controller and a sensor array comprising an initial sensor configured to detect possible-items placed into the physical shopping cart and a secondary sensor configured to determine if possible-items detected by the initial sensor is are items-of-interest. The physical shopping cart is configured to maintain the secondary sensor in a low-power state; sense a possible-item placed into the physical shopping cart; determine if the possible-item is an item-of-interest; and transmit a sense-message that identifies the item-of-interest.

20 Claims, 20 Drawing Sheets

(56) References Cited

U.S. PATENT DOCUMENTS

| | | | |
|---|---|---|---|
| 5,729,697 | A | 3/1998 | Schkolnick et al. |
| 5,773,954 | A | 6/1998 | VanHorn |
| 5,939,695 | A | 8/1999 | Nelson |
| 6,032,127 | A | 2/2000 | Schkolnick et al. |
| 6,484,939 | B1 | 11/2002 | Blaeuer |
| 6,928,343 | B2 | 8/2005 | Cato |
| 6,997,382 | B1 | 2/2006 | Bhri |
| 7,100,824 | B2 * | 9/2006 | Ostrowski .......... G08B 13/1961 235/383 |
| 7,225,980 | B2 | 6/2007 | Ku et al. |
| 7,741,808 | B2 | 6/2010 | Fowler et al. |
| 7,934,647 | B1 | 5/2011 | Mims et al. |
| 8,120,190 | B2 | 2/2012 | Bravo |
| 9,288,268 | B2 * | 3/2016 | Ramaswamy .......... H04L 67/12 |
| 2008/0122227 | A1 | 5/2008 | Hammerle |
| 2008/0243626 | A1 | 10/2008 | Stawar et al. |
| 2009/0058357 | A1 | 3/2009 | Saker et al. |
| 2009/0231135 | A1 | 9/2009 | Chaves et al. |
| 2011/0084659 | A1 | 4/2011 | Neiemann et al. |
| 2012/0049539 | A1 | 3/2012 | Sanvik |
| 2014/0350710 | A1 | 11/2014 | Gopalakrishnan et al. |
| 2014/0350715 | A1 | 11/2014 | Gopalakrishnan et al. |
| 2015/0012396 | A1 | 1/2015 | Puerini et al. |
| 2015/0019391 | A1 | 1/2015 | Kumar et al. |
| 2015/0127496 | A1 * | 5/2015 | Marathe ............... G06Q 10/087 705/28 |
| 2016/0260161 | A1 | 9/2016 | Atchley et al. |
| 2017/0076354 | A1 | 3/2017 | High et al. |
| 2018/0099185 | A1 * | 4/2018 | Jones ..................... A63B 24/00 |
| 2018/0315011 | A1 * | 11/2018 | Clarke ................. G07G 1/0081 |
| 2019/0138975 | A1 * | 5/2019 | Zuberi ............... G06K 7/10366 |

OTHER PUBLICATIONS

Hellenschmidt & Kamieth, "BERNIE—Consultant for Nutrition and Intelligenct Shopping," Communications in Computer and Information Science, 2007, 11:28-239.

Lauzon et al, "Point of Sale Grocery Cart," Michigan State College of Engineering, 2014, 69 pages.

rfidarena.com [online], "RFID shopping-cart level checkout is possible with technology that is available today," [retrieved on Jul. 20, 2017], retrieved from : URL <http://www.rfidarena.com/2014/5/15/rfid-shopping-cart-level-checkout-is-possible-with-te/>, 12 pages.

Tesco.com [online], "Scan as you Shop," [retrieved on Jul. 20, 2017], retrieved from : URL <https://www.tesco.com/scan-as-you-shop/>, 7 pages.

* cited by examiner

PHYSICAL SHOPPING CART HAVING FEATURES FOR USE IN CUSTOMER CHECKOUT OF ITEMS PLACED INTO THE SHOPPING CART

CROSS-REFERENCE TO RELATED APPLICATIONS

This application claims the benefit of U.S. Provisional Application 62/784,162, entitled "PHYSICAL SHOPPING CART HAVING FEATURES FOR USE IN CUSTOMER CHECKOUT OF ITEMS PLACED INTO THE SHOPPING CART" and filed on Dec. 21, 2018, the entire contents of which are hereby incorporated by reference.

TECHNICAL FIELD

This document generally relates to physical shopping carts that are used in physical retail stores and other shopping establishments, and to the association of mobile computing devices with such physical shopping carts.

BACKGROUND

Physical shopping charts have been used in retail stores and a variety of other shopping establishments (e.g., grocery stores, home improvement stores) to provide customers with a way to collect and transport items to a checkout area (e.g., point of sale terminal, cashier). Although physical shopping carts have a variety of different form factors and configurations, physical shopping carts generally include a frame, an area for the placement of items (e.g., basket, bin, platform), and a handle or other mechanism for customers to move the cart around. Physical shopping carts can include wheels on which the frame is mounted to permit the cart to be pushed around a store. Alternatively, physical shopping carts can include a handle or other mechanism permitting users to carry carts around a store.

SUMMARY

This document generally describes technology for providing physical shopping carts with product detection systems and associating physical shopping carts with mobile computing devices (e.g., smartphones, tablet computing devices, smart watches, wearable computing devices). For example, physical shopping carts can be equipped with one or more product detection systems (e.g., scanners, sensors, cameras) that can electronically tally products that are placed in physical shopping carts. Mobile computing devices can be associated with and mounted on the physical shopping carts to provide a variety of enhanced shopping cart features not possible with conventional physical shopping carts, such as electronically tracking the contents of a shopping cart, checking-out from the mobile computing device (instead of at conventional check-out areas, such as point of sale terminals), and others.

In order to provide the user with a convenient way to use their mobile device while using the shopping cart, the cart can include a mounting area into which the mobile computing device can be mounted. This mounting can allow the user to view and interact with the mobile device while shopping. For example, the user may place an item into the cart, which is then detected by the cart. The cart can communicate this placement to the mobile computing device, which can then update a shopping application with the placement. The placement can trigger an update to the mobile computing device's display, which can be seen by the user as the mobile computing device is mounted in the mounting area.

The cart can have further features that are useful in this scenario. For example, a bag dispenser may be affixed within the shopping cart so that, as the user shops and places items in the cart, the user can place them in an open back in the bag dispenser within the cart. This can result in advantageously allowing the user to bag their own items as they shop with no more effort than placing items in the cart, reducing the effort needed to complete a shopping trip.

In one implementation, a physical shopping cart is configured to transport physical goods around a store. The physical shopping cart comprises a controller having a processor and memory. The physical shopping cart comprises a sensor array comprising an initial sensor configured to detect possible-items placed into the physical shopping cart; and a secondary sensor configured to determine if possible-items detected by the initial sensor is are items-of-interest. The physical shopping cart is configured to maintain the secondary sensor in a low-power state; sense a possible-item placed into the physical shopping cart; responsive to sensing a possible-item placed into the physical shopping cart, activate the secondary sensor out of the low-power state and determine if the possible-item is an item-of-interest; and responsive to determining that the possible-item is an item of interest, transmit a sense-message that identifies the item-of-interest. Other implementations include products, systems, devices, software, and methods.

Implementations can include one, none, or some of the following features. The physical shopping cart further comprises a basket having an entrance area and a containment area into which possible-items can be placed by passing the possible-items through the entrance area; and wherein the initial-sensor is configured to detect the possible-items placed into the physical shopping cart when the possible-items pass through the entrance area. The initial sensor is a gesture sensor configured to sense movement and the secondary sensor is a vision sensor configured to capture images. The physical shopping cart further comprises an RFID sensor, and wherein the physical shopping cart is further configured to: sense a second item-of-interest with the RFID sensor; and responsive to sensing the second item-of-interest with the RFID sensor, transmit a second sense-message that identifies the second item-of-interest. The initial sensor is a gesture sensor configured to sense movement and the secondary sensor is a RFID sensor. To transmit a sense-message that identifies the item-of-interest comprises transmitting, to the controller, the sense-message; and wherein the controller is further configured to receive the sense-message; send, to an off-physical-shopping-cart device, an update-message containing information about the item-of-interest. The off-physical-shopping-cart device is a mobile computing device that maintains a virtual shopping cart with a record of items-of-interest in the physical shopping cart. The physical shopping cart further comprises a mounting fixture into which the user can removably mount the mobile computing device. A system comprising the physical shopping cart and the mobile computing device. The physical shopping cart is further configured to transmit a location of the physical shopping cart. The initial sensor and the secondary sensor are housed in a single sensor pod. The physical shopping cart is further configured to, responsive to sensing a possible-item placed into the physical shopping cart, activate a second secondary sensor out of a low-power state and determine if the possible-item is an item-of-interest while the secondary sensor is also activated out of the low-power state. A system comprising the physical shopping cart and a facility server configured to receive the sense-message that identifies the item-of-interest; and identify the item-of-interest based on the received sense-message. The physical shopping cart is further configured to transmit a location of the physical shopping cart; and the facility server is further configured to identify the item-of-interest based on the received sense-message using the location of the physical shopping cart. The facility server is further configured to identify the item-of-interest based on the received sense-message using the location of the physical shopping cart by generating, out of a list of possible items in the facility, a list of possible items near the physical shopping cart. The facility server is further configured to generate a plurality of confidence values; and identify the item-of-interest based on the received sense-message by determining that a confidence value associated with the item-of-interest is greater than a first threshold value. The facility server is further configured to identify the item-of-interest based on the received sense-message by determining that a confidence value associated with the item-of-interest is greater than other confidence values by a second threshold value.

The systems, devices, program products, and processes described throughout this document can, in some instances, provide one or more of the following advantages. A shopping cart can provide a user with tools to track items placed in the cart. This can allow a user to advantageously manage a shopping session using a mobile computing device such as their mobile phone. The user can then complete a purchase of all items in the cart without the time and effort needed to unload the cart at a cash register. This technology can be used to improve the efficiency and user experience in a physical store during a shopping experience. A bag dispenser inside of a cart can allow for a quicker and easier bagging workflow in shopping sessions in which items do not need to be scanned at a cash register. Other features, aspects and potential advantages will be apparent from the accompanying description and figures.

DESCRIPTION OF DRAWINGS

Like reference symbols in the various drawings indicate like elements

DETAILED DESCRIPTION

Figure 1:
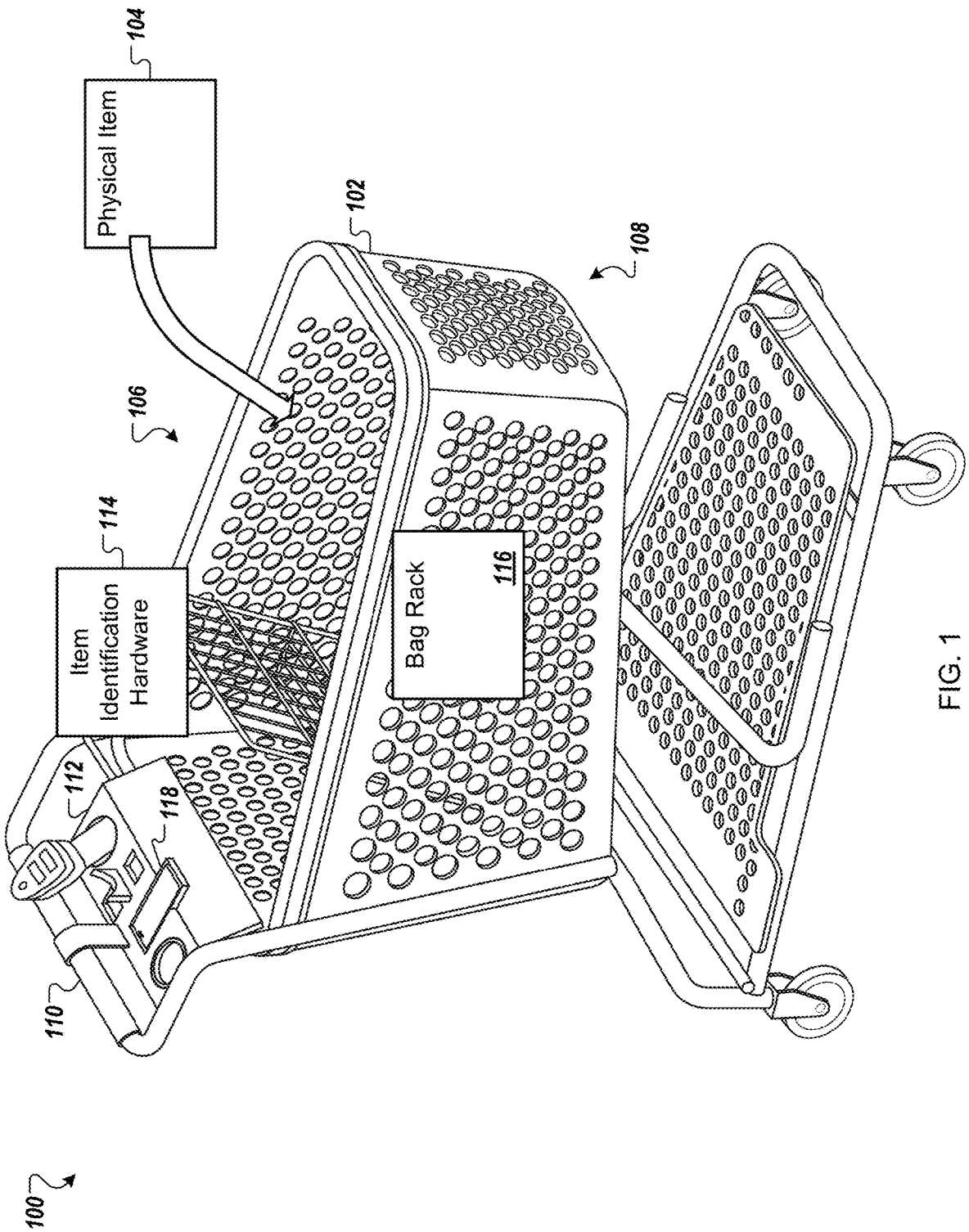
FIG. 1 is a diagram of an example physical shopping cart having features for use in customer checkout of items placed in the shopping cart.

This document describes a physical shopping cart having features for use in customer checkout of items placed into the shopping cart. For example, the shopping cart may have hardware for scanning or detecting physical goods placed into the shopping cart, hardware for transmiting information about those physical goods to a mobile computing device, and hardware for mounting the mobile computing device to the physical shopping cart.

For example, the physical shopping cart may include a mounting fixture positioned between the handle of the cart and the basket. This mounting fixture may include elements into which the user can removably mount their mobile computing device (e.g., cell phone, tablet). This mobile computing device may be paired with the physical shopping cart in order to be used in a customer-lead purchase session in which the customer picks out physical goods that are scanned or detected by the shopping cart as the customer selects and places the physical goods into the physical shopping cart.

For example, the physical shopping cart can include hardware to allow the user to scan physical items as they are selected and placed into the physical shopping cart. This hardware can include, for example, a handheld scanning device that the user can use to can use to scan barcodes of physical goods being selected. The scanner can transmit information about the selected item to a computing device (e.g., a mobile computing device, a computing device on the physical shopping cart) with information about the scanned physical good in order to add that physical good to a logical shopping cart that tracks what has been scanned.

For example, the physical shopping cart can include hardware that detects physical items being placed in the cart. This can include, for example, gesture sensors that sense gestures when the physical item crosses a sensor plane on an entrance area of the cart. This can also or alternatively include computer vision sensors, radio frequency identification (RFID) sensors, infrared (IR) sensors, lasers, etc. This can enable sensing of items placed into the cart without additional special activities or input by the user. The hardware can then transmit information about the selected items to a computing device to be added to a logical shopping cart that tracks physical items in the physical shopping cart.

For example, the physical shopping cart can include a bag dispenser containing many shopping bags (e.g., so-called t-shirt bags, reusable bags.) In some cases, the dispenser can present a bag for user grasping, and as one bag is removed, the next bag can be presented. This rack can hold the bag within a basket portion of the physical shopping cart so that, when a user is placing items into the physical shopping cart, those items can be placed directly into the bag in which the user will later carry the physical good. This can be particularly beneficial, for example, in instances in which the user does not need to remove items from the physical shopping cart in order to process a purchase transaction for the physical items in the physical shopping cart.

FIG. 1 is a diagram of an example physical shopping cart 100 having features for use in customer checkout of items placed in the shopping cart. For example, the physical shopping cart 100 can include a basket 102 into which physical items 104 can be placed. For example, as a user (e.g., a shopper) walks around a store with the physical shopping cart 100, the use may select physical items 104 (e.g., items on shelves sold by the store) and may place the physical items 104 into the basket 102 so that they are conveniently transported with the user as they walk through the store.

When placing the physical items 104 into the physical cart 100, the physical item 104 can pass through an entrance area 106 of the basket 102. In general, the entrance area 106 can include the area at the mouth, lip, or other ingress area of the basket 106. Once past the entrance area 106, the physical item 104 can rest in the containment area 108 of the physical cart 102. The containment area 108 may include area or areas inside the basket 102 past the entrance area 106. In this example, the containment area 108 includes area adjacent to the bottom and sidewalls of the basket 102. However, as will be understood, different configurations of the basket 102 can produce different entrance areas and different containment areas.

A handle 110 includes hardware configured to receive a user's handhold for the purpose of propelling the physical shopping cart 100. In many cases, the handle 110 is rigidly coupled to the basket 108 or other structure of the physical shopping cart 100 so that, as the user applies force to the handle, the force is transmitted to the physical shopping cart 100 in order to move the physical shopping cart.

One or more mounting fixtures 112 may be included in the physical shopping cart 110. The mounting fixture 112 can be configured to removably mount one or more devices onto the physical shopping cart 110. For example, a mounting fixture 112 may be configured to hold a mobile computing devices such as a phone for the user as the user is pushing the physical shopping cart 100. In this way, the user may advantageously be able to see the screen of the mobile computing device as the user is shopping without having to hold the mobile computing device with hands that can be used for shopping tasks (e.g., placing a physical item 104 into the basket 102.) In another example, a physical shopping cart may have one or more other mounting fixtures in order to mount, for example, a hand-held scanner, a water bottle, a loyalty card, etc. The shape of the mounting fixture 112 can be configured based on the type of device to be mounted. For example, a mounting fixture 112 to hold a mobile computing device may have generally straight surfaces in a shape that holds a mobile computing device without significant movement. Example mounting fixtures of different shapes are described in greater detail below.

In this example, the mounting fixture 112 is positioned between the handle 110 and the basket 102. This positioning may advantageously keep the mobile computing device near enough the user that they can clearly see the display and the contents of the cart from a single view behind the cart, which is where many users will be positioned when pushing with the handle 110.

The mounting fixture 112 may be oriented in order to hold a mobile computing device in a particular orientation. For example, the mounting fixture may be rigid or adjustable in order to control the orientation of the display of a mounted mobile computing device. In one implementation, the mounting fixture 112 may be configured hold the display of the mobile computing device horizontal or generally horizontal (e.g., within two degrees of horizontal). This can allow, for example, a user to be able to read the display from any point around the physical shopping cart 100. In one implementation, the mounting fixture can hold the mobile computing device so that the display is within 10 degrees of horizontal. This can allow, for example, a user to easily see the display when pushing on the handle 110 while also allowing the user to be able to see the display from any point around the physical shopping cart 100.

Item selection hardware 114 can include computer and electronic hardware that is configured to identify physical items 104 that are placed in the physical shopping cart 100. This can include, for example, sensors, data processors, computer memory, and data transceivers that can work with the mobile computing device mounted in the mounting fixture 112. For example, the mobile computing device 112 can run a shopping application that manages a shopping session for the user. As the user selects physical items 104 and scans the physical items 104 and/or places the physical items 104 into the physical shopping cart 100, the item detection hardware 114 can send messages to the mobile computing device with details about the physical items 104. In some cases, elements of the item detection hardware 114 are installable onto the cart. For example, after-market item detection hardware may be latched, bolted, or otherwise installed onto a physical shopping cart 100 after the physical shopping cart 100 is manufactured. In some cases, elements of the item detection hardware 114 are integral to the physical shopping cart. For example, the item detection hardware 114 may be positioned within the frame of the physical shopping cart 100 as part of manufacturing the physical shopping cart 100.

The item detection hardware 114 can pair with a mobile computing device. For example, the mobile computing device may run a shopping application that is published by the store or other organization that provides the physical shopping cart 110. The mobile computing device may execute a pairing routine to pair with the physical shopping cart 110 though the exchange of data. In one example, an element of the physical shopping cart (e.g. a surface of the basket 102, a surface of a hand-scanner) may contain a barcode code, which can be scanned by the mobile computing device. In another example, the mounting fixture may include a wire or plug-in dock to exchange data. In another example, the application on the mobile device may display a barcode such as a barcode to be scanned by the item detection hardware 114.

The physical shopping cart 100 may include a bag dispenser 116 to hold bags within the basket 108. As the user places the physical items 104 into the physical shopping cart 100, the user may place the physical items into a bag of the bag dispenser 116. This may allow the user to bag the physical items 104 as they are selected. Then, because their purchase can occur without the need to unload and scan the physical items at a cashier's station at the end of the shopping session, the user may remove all purchased physical items 104 in bags. This may advantageously reduce the effort and number of actions needed after a purchase is completed.

Figure 2A:
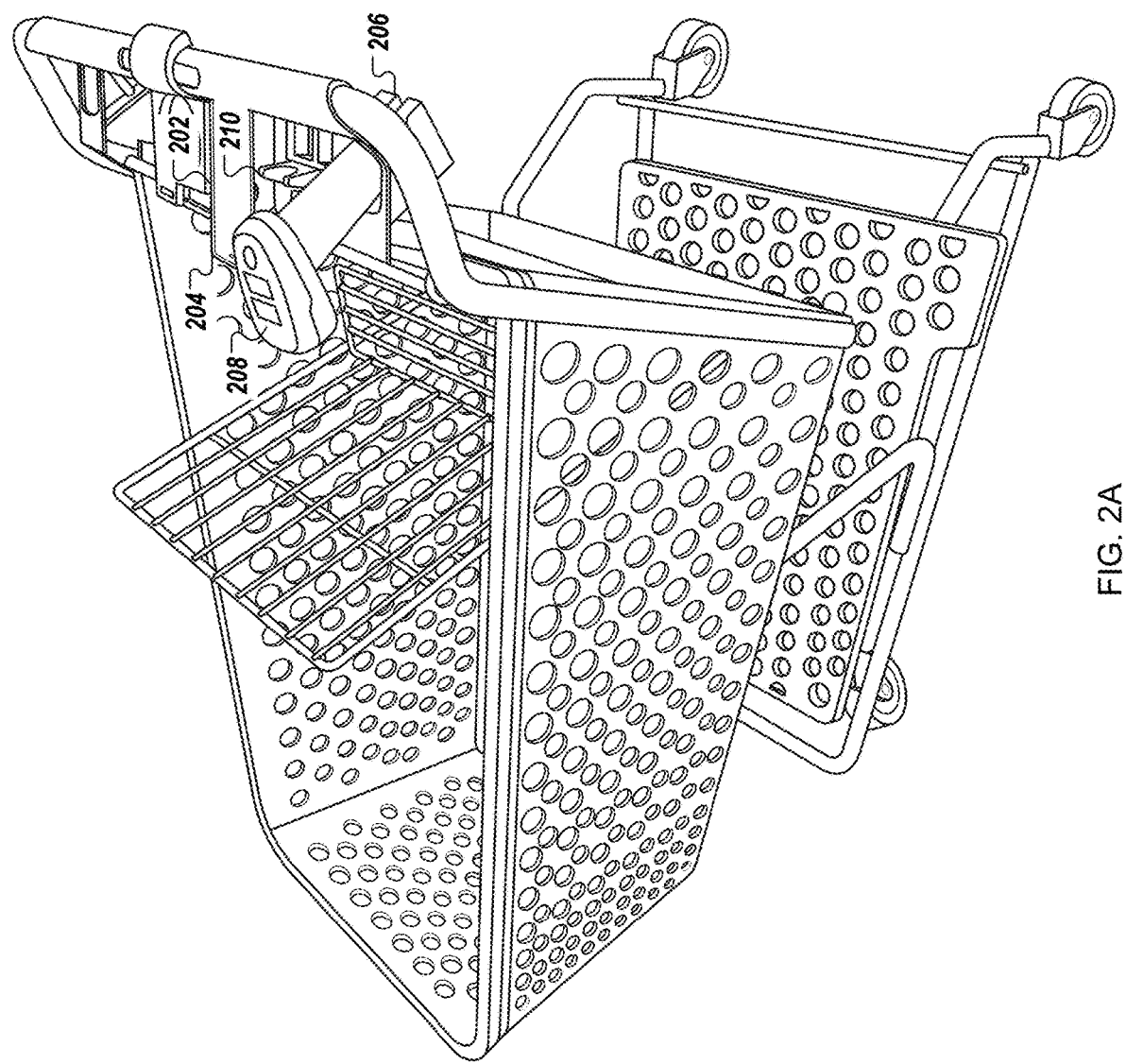
FIGS. 2A and 2B are examples of a physical shopping cart having a mounting fixture for mounting a mobile computing device and a scanner.
Figure 2B:
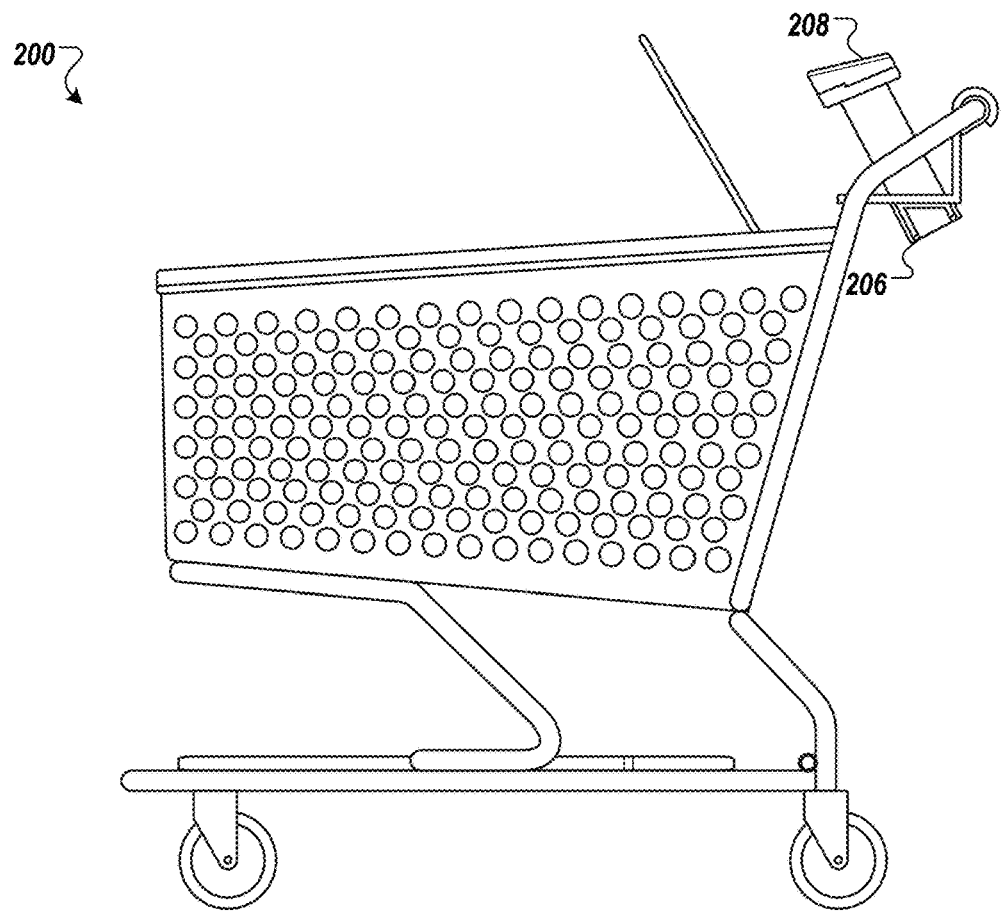
Figure 2B:
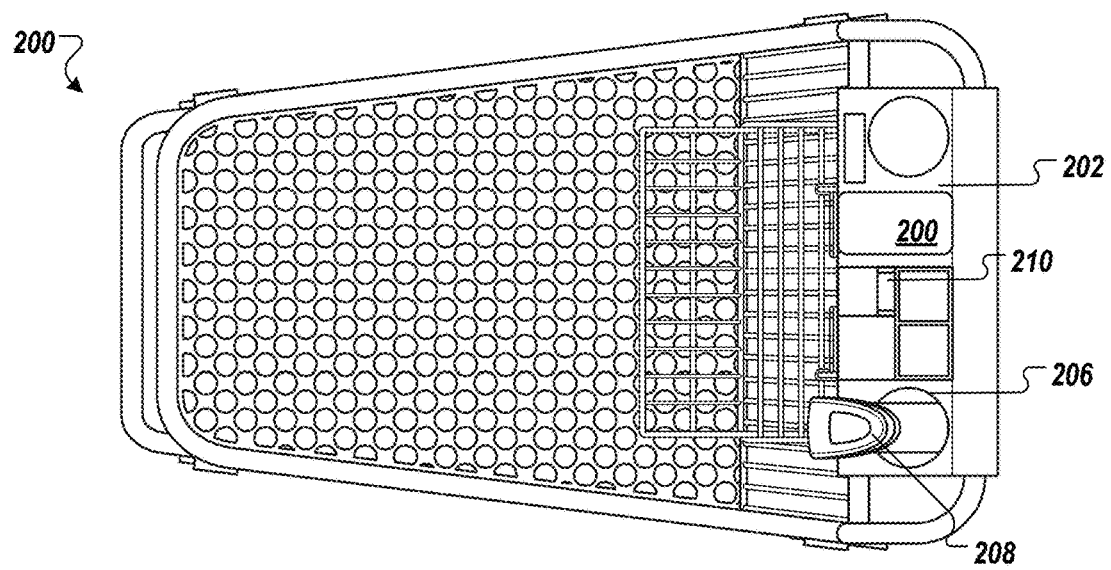

FIGS. 2A and 2B are examples of a physical shopping cart 200 having a first mounting fixture 202 for mounting a mobile computing device 204 and a second mounting fixture 206 for mounting a handheld scanner 208.

The physical shopping cart 200 can be used in a retail environment and allow a user to scan physical items with the handheld scanner 204 as the user selects the physical items for purchase. For example, a user may push the physical shopping cart 200 around a store, perusing the items on shelves for sale. The user may then pick up an item they are interested in. The user may then unmount the handheld scanner 208 from the second mounting fixture 206 and scan the physical item with the handheld scanner 208. After this scanning, the user can place the physical item into the physical cart 200, for example in the basket or on a lower section of the physical cart 200. After the handheld scanner 208 scans the item (e.g., reading a barcode by emitting one or more lasers and sensing their reflection), the handheld scanner 208 can transmit a message to the mobile computing device 204 about the scanning event. The mobile computing device 204 may, for example, update a graphical user display that shows information about the physical item in an application, website, etc. As shown here, the mobile computing device 204 is removably mounted in the mounting fixture 202. As such, the user is able to see the update to the mobile computing device's 204 display from any position around the physical shopping cart 200. This can include from the sides or front of the cart while placing the physical item into the physical shopping cart 200, or from behind the physical shopping cart 200 when holding the handle of the physical shopping cart.

In some examples, physical shopping carts can include other mounting fixtures. For example, the physical shopping cart 200 can include an auxiliary mounting fixture 208 configured to removably mount a cup. In this example shown, a cup holder is positioned between the handle and the basket of the cart to allow the user to place and remove a cup in the auxiliary mounting fixture 208 while shopping. For example, the physical shopping cart 200 can include an auxiliary mounting fixture 210 configured to removably mount a bottle of water. In this example shown, a water-bottle bracket is positioned between the handle and the basket of the cart to allow the user to place and remove a bottle of water in the auxiliary mounting fixture 210 while shopping.

Figure 3A:
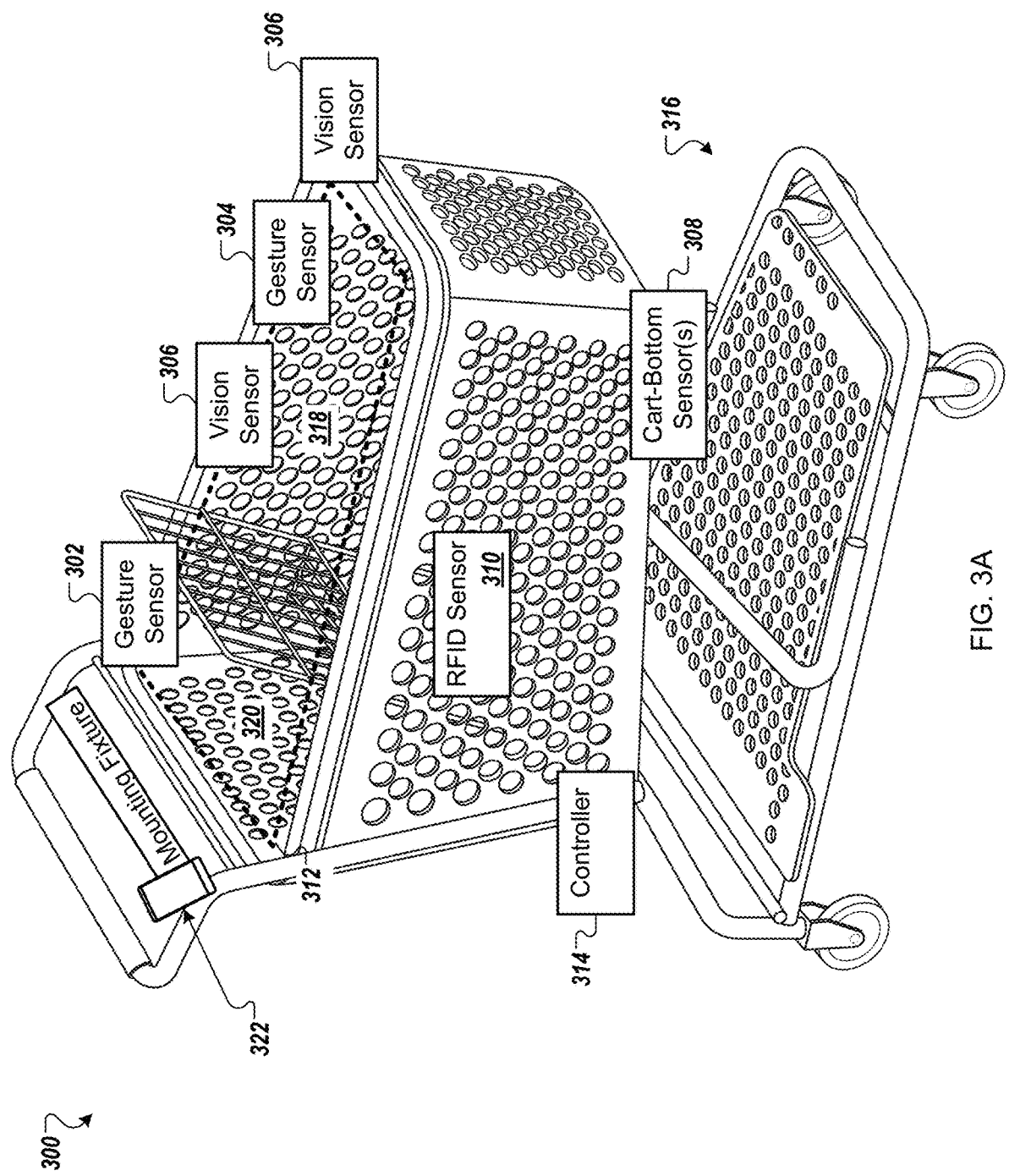
FIGS. 3A, 3B, and 3C are examples of a physical shopping cart having sensors to automatically detect items placed in the shopping cart.
Figure 3B:
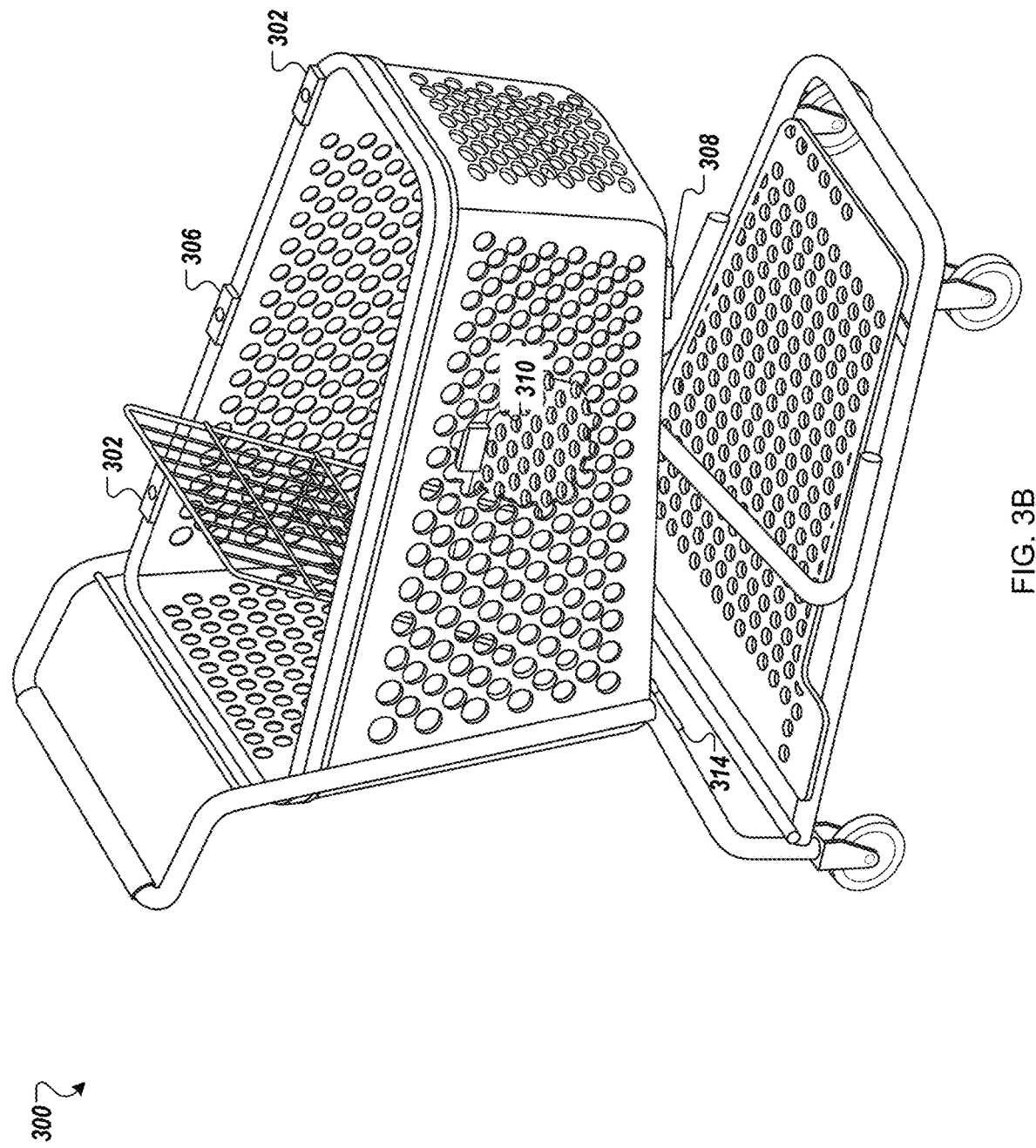

FIGS. 3A and 3B are examples of a physical shopping cart 300 having sensors to automatically detect items placed in the shopping cart. For example, the physical shopping cart 300 can include gesture sensors 302 and 304, a vision sensor 306, a cart-bottom sensor 308, and/or a radio frequency identification (RFID) sensor 310, all in communication with a controller 314. In some configurations, these sensors can include vision sensors, RFID sensors, IR sensors, lasers, etc.

The physical shopping cart 300 can be used in a retail environment and automatically identify physical items placed into the physical shopping cart by users. For example, a user may push the physical shopping cart 300 around a store, perusing the items on the shelves for sale. The user may then pick up an item they are interested in and place it in the physical shopping cart 300.

Some or all of the sensors 302-310 can create a sensor plane 312 in the entrance area of the basket of the physical shopping cart 300. This sensor plane describes a plane that is within the sensing area of at least one of the sensors 302-310 where the identity of a passing physical item can be determined. When the user passes a physical item through the entrance area of the basket, the physical item passes through the sensor plane 312. The sensors 302-310 can sense this event and transmit data of the event to the controller 314. The controller 314 may then process the data and determine what kind of physical item was placed into the basket of the physical cart 300. Then, the controller 314 can process this placement, for example by updating a logical shopping cart or sending a message to a paired mobile computing device.

This sensing can be performed without any particular input. For example, the sensors 302-310 can be configured and/or positioned so that, as a user undertakes natural, instinctive, and/or traditional actions used to place physical items into the physical shopping cart 300, the sensors are able to capture this phenomena such that they can identify the placement and/or identify the item that was placed into the physical shopping cart 300.

For example, gesture sensors 302 and/or 304 may detect the movement of the users hand and/or the movement of the physical item through the sensor plain 312. In some implementations, the gesture sensors 302 and/or 304 may include proximity sensors, distance sensors, tripline (e.g. laser) sensors, etc. The gesture sensors 302 and/or 304 can include hardware capable of discerning the direction of a gesture. For example, the gesture sensors 302 and/or 304 may be able to sense, or provide data to e.g., the controller 314 so the controller 314 can determine, the direction of a physical item moving through the sensor plain 312.

A vision sensor can capture computer vision (e.g., still image or images, video data) of physical items, user hands, or other objects passing through the sensor plane 312. In some implementations, the cart-bottom sensor 308 can include an image sensor such as a complementary metal oxide semiconductor (CMOS) sensor or a charged couple device (CCD). In some cases, the cart-bottom sensor 308 can be configured to only engage in response to a gesture sensor 302 and/or 304 detecting a gesture. Such a configuration may advantageously reduce the amount of time the vision sensor 306 is engaged in a shopping session. In some cases, the cart-bottom sensor 308 can be engaged at all times. This can advantageously ensure that any item to pass through the sensor plain 312 is captured with computer vision for, e.g., identification purposes.

In some implementations, the vision sensors used may use a global shutter. A vision sensor with a global shutter is configured to capture data across the surface of the sensor all at the same time or substantially at the same time. This may be beneficial, for example, because a global shutter may be able to capture images without artifacts that can sometimes be produced by a rolling shutter image sensor. For example, if an object is moving while being captured by a vision sensor, the movement may create artifacts that appear to stretch or repeat the image of the object, and in some cases these artifacts can hinder automated item recognition. However, some implementations may use rolling shutter vision sensors or a combination of global shutter vision sensors and global shutter vision sensors.

The RFID sensor can capture an RFID identifier for physical items having RFID tags. In some implementations, the RFID sensor can include a field generator and a field sensor that examines the field for disturbances caused by RFID tags. In some cases, the RFID sensor can be configured to only engage in response to a to a gesture sensor 302 and/or 304 detecting a gesture. Such a configuration may advantageously reduce the amount of time the RFID sensor is engaged in a shopping session. In some cases, the RFID sensor 310 can be engaged at all times. This can advantageously ensure that any item to pass through the sensor plane 312 is captured with RFID sensing, e.g., for identification purposes.

In some cases, the physical shopping cart 300 can include both a cart-bottom sensor 308 and a RFID sensor 310. For example, a particular store may sell durable goods that are expected to always have a mostly consistent appearance. For example, rigid plastic boxes and paper cartons are likely to maintain their shape through shopping sessions, stocking activities, etc. These consistent physical goods can be sensed using the cart-bottom sensor 308 as the vision sensor and/or controller 314 can be trained on their consistent appearance. In addition, the store may also sell goods that are likely to have inconsistent appearances. Fresh produce, bulk items apportioned out by the customer, and soft-goods (e.g., clothing, linens) can all be expected to change shape and/or appearance. As such, the store may tag these physical items (but not, e.g., the consistent physical items) with RFID tags. Such a scheme may allow for reliable item identification while maintaining a lower cost and complexity than a scheme involving the tagging of every item including consistent physical items.

The physical shopping cart 300 can include a cart-bottom sensor 308 configured and positioned to identify items placed in the cart bottom 316. The cart bottom sensor 308 can include gesture sensing hardware, vision sensing hardware, and/or RFID sensing hardware. In some cases, a single RFID sensor 310 can be used to sense RFID tags anywhere in the physical shopping cart 300.

In some cases, the physical shopping cart 300 can include a basket having a main area 318 and an auxiliary area 320 separated by a movable partition. For example, the main area 318 may be larger and intended to hold larger physical items, while the auxiliary area 320 may be intended to hold a child, smaller/delicate items, contaminates such as raw meat that should be sequestered from other food items, etc. A movable partition can be movably affixed to the physical shopping cart 300 such that, when the movable partition is in a first position the auxiliary area 320 is available for use and with the movable partition in a second position the auxiliary area 320 is closed and the main area 318 is enlarged. In such cases, some of the sensors may be configured and positioned so that they sense in only the main area 318 or in different areas depending on the position of the movable partition. For example, gesture sensor 302 may, when the movable partition is in a first position, sense gestures in the auxiliary area 318. When the movable partition is in a second position, the same gesture sensor 302 may be configured to sense gestures in the proximal end of the main area 318. Similarly, a vision sensor (not shown) can be configured to capture computer vision in either the auxiliary area 320 or the main area 318 depending on the state of the movable partition.

The physical shopping cart 300 can additionally include a mounting fixture that can hold a user's mobile computing device 322, which can communicate with the controller 314, directly (e.g., pairing between device 322 and controller 314) and/or indirectly (e.g., communication between the device 322 and the controller 314 via one or more server systems), to present a virtual shopping cart for the automatically detected items in the cart 300. For example, the user computing device 322 can be a smartphone that presents a running tally of the automatically detected items placed in the cart 300, along with the quantity of each item, the price of each item, discounts being applied to each item, and a total cost of the items. The user computing device 322 can additionally be used to manually scan items that are placed in the cart 300, such as being placed in locations where automatic detection may not be possible (e.g., bottom rack of the cart 300), where the items is unable to be detected (e.g., soft good that is unable to be optically identified), and/or other limitations of the automated detection system.

The controller 314 can be mounted onto, or integrated into, the physical shopping cart 300 in various locations. For example, in FIG. 3B, the controller 314 is shown mounted to the underside of a support for the main area 318. In another implementation, the controller 314 can be integrated into the support for the main area 318. In another implementation, the controller can be mounted to or integrated into the horizontal support of the cart bottom 316. In another implementation, the controller can be mounted to or integrated into the mounting fixture 322. In another implementation, the controller can be mounted to or integrated into a wall of the main area 318. In another implementation, the controller can be mounted to or integrated into the handle of the physical shopping cart 300

Figure 3C:
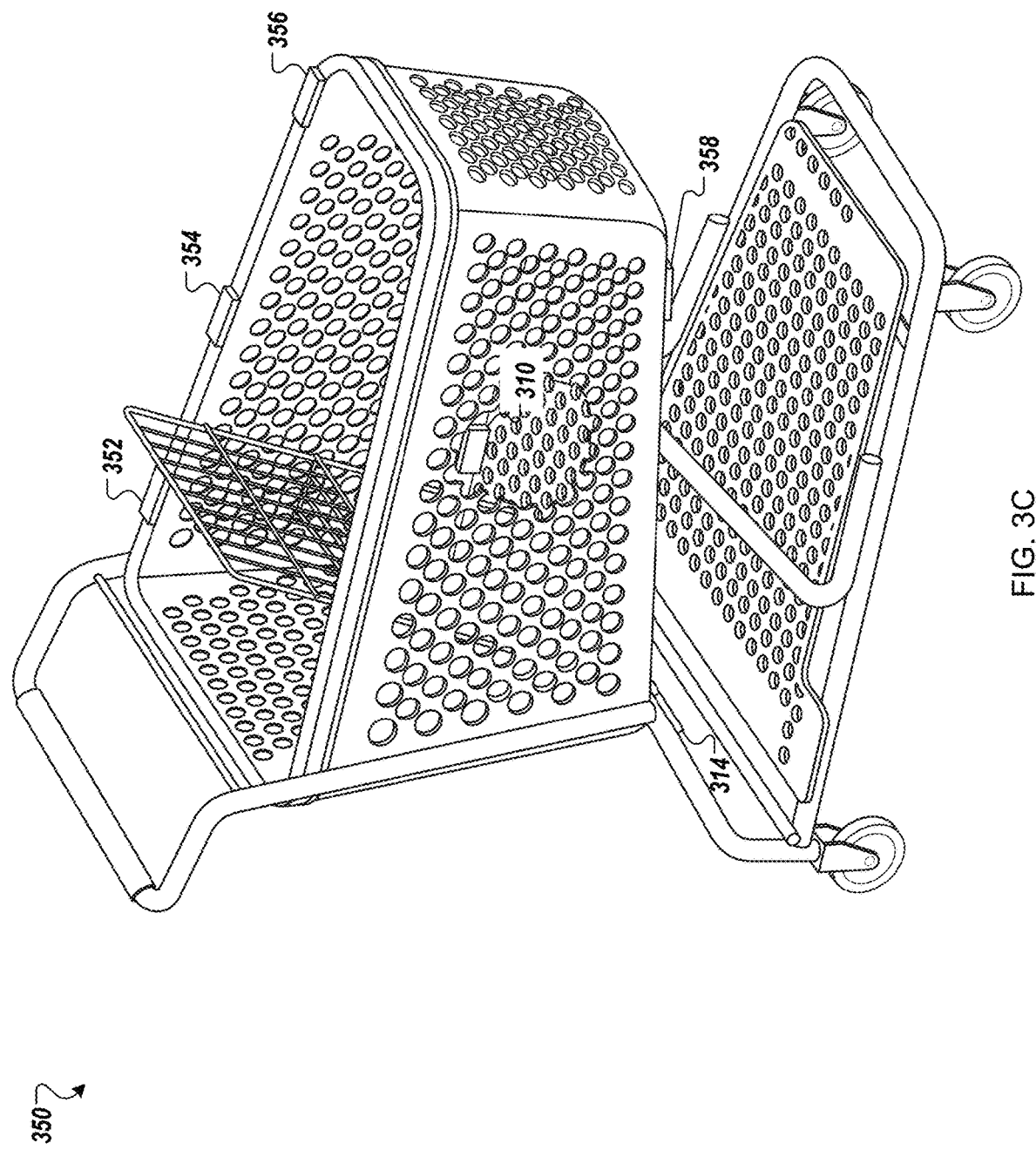

FIG. 3C is an example of a physical shopping cart 350 having sensors to automatically detect items placed in the shopping cart. For example, the physical shopping cart 350 can include sensor pods 352-358 used to detect and recognize items placed in the physical shopping cart 350.

Each of the sensor pods 352-358 can include an initial sensor and a secondary sensor. In operation, the controller 314 can enable only the initial sensors of the sensor pods 352-358 and wait for a signal from one of the initial sensors of the sensor pods 352-358. When an initial signal is received, the controller 314 can activate all the secondary sensors in the sensor pods 352-358 that are in the same area of the physical shopping cart 350.

For example, he primary sensors in the sensor pods 352-358 may be motion sensors (or, e.g., a light sensor, laser sensor) that provide the controller 314 with a signal if the user of the device 350 places an item in the corresponding area of the physical cart. That is, if an item is placed in the auxiliary area 320, the sensor pod 352's primary sensor can sense this placement and the sensor pod 352 can send a sensor signal to the controller 314.

In response, the controller 314 can instruct some or all of the sensor pods 352-358 associated with that area to activate in order to identify the item placed in the cart 350. For example, if a primary sensor in the sensor pod 356 detects an item placed into the main area 318, the controller 314 can instruct the sensor pod 354 and the sensor pod 356 to engage their respective secondary sensors to identify the item placed into the main area 318. In this example, two sensor pods are used for one area of the cart. This can be beneficial, for example, in situations in which a sensor pod's field of view becomes occluded by a large item in the cart. If a new, small item in added to the cart, another sensor pod with a different vantage point may still be able to identify the item.

This example shows one area of the physical shopping cart having two sensor pods while some areas of the physical shopping cart have one sensor pod each. However, other configurations are possible. For example, each area may be a plurality (two, three, or more) of sensor pods. FIG. 4A is a flowchart of an example technique 400 for automatically detecting items placed in a shopping cart. The example technique 400 is depicted as being performed using the example cart 300 depicted in and described with regard to FIGS. 3A-B. However, the technique 400 can be performed on any of a variety of other cart configurations, such as cart configurations with the same or similar sensor arrays, different storage locations, bin arrangements, and/or other features.

Figure 4:
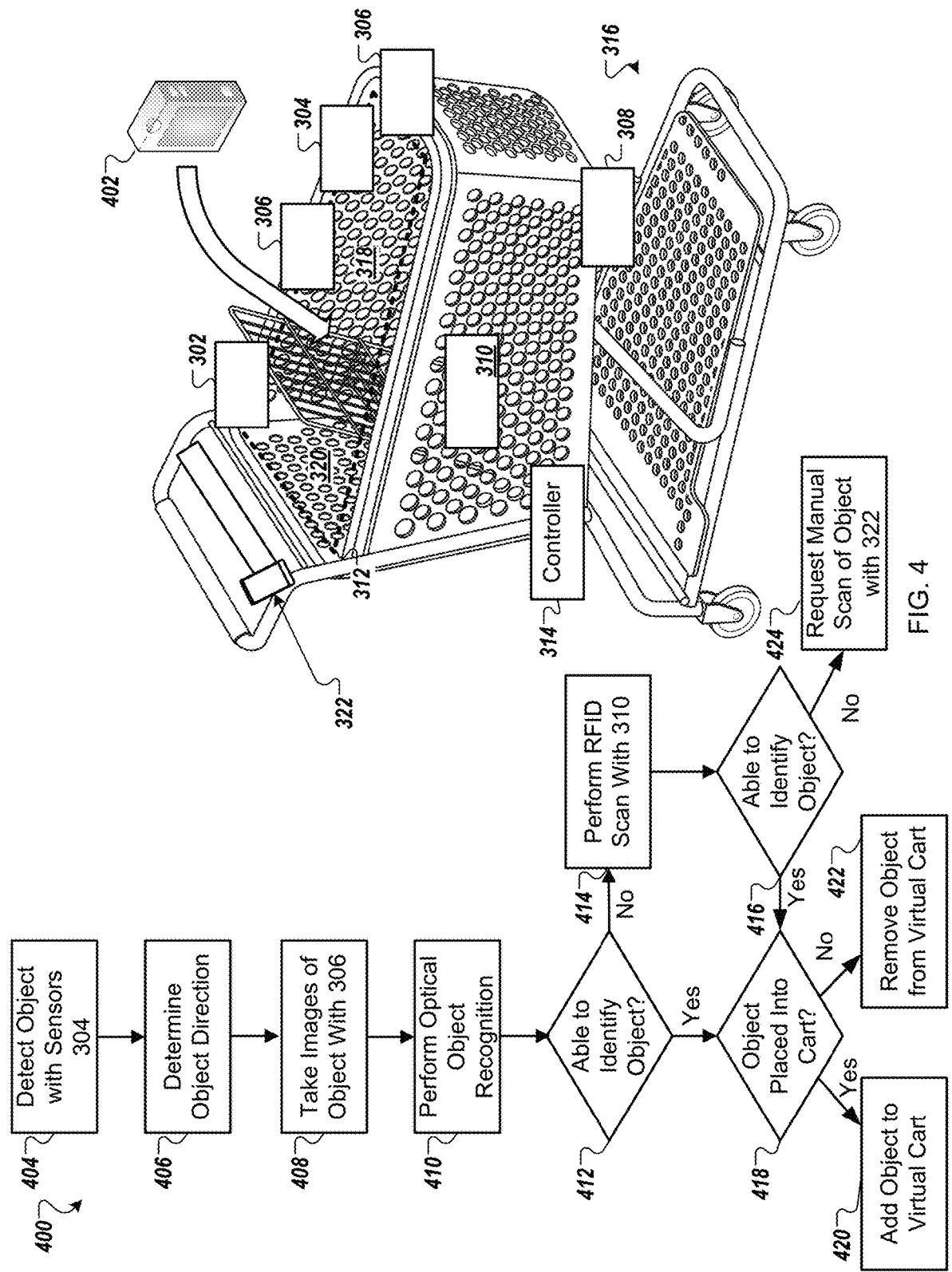
FIG. 4 is a flowchart of an example technique for automatically detecting items placed in a shopping cart.

As depicted in FIG. 4, an example item 402 is physically placed in the shopping cart 300 in the main area of the cart with the gesture sensor 304, the vision sensors 306, and the RFID sensor 310. The technique 400 is an example process for using this configuration of example sensors in the cart 300 to automatically detect the item 402. The technique 400 starts with using the sensors 304 to detect the presence and movement of the item 402 (404). While waiting for an object to be detected, the other sensors (vision sensors 306, RFID sensors 310) may not be actively monitoring for the item. However, once a first set of sensors (e.g., gesture sensors 304) detect the item 402, then the cart 300 can shift to using one or more of these other sensors to more accurately detect the item. The initial set of sensors 304 that are used to detect the item 402 may begin with a high-level of granularity that simply detects whether an item is approaching and/or breaking the plane of the cart's main opening. The other sensors (vision sensors 306, RFID sensors 310) can detect the item 402 with a greater level of detail and accuracy, including being able to accurately identify the item 402. However, such detection can be more computationally intensive and, as a result, can consume greater computing resources and power (e.g., battery power), so it may be used as little as possible and when warranted (e.g., in response to detecting the item 402 entering the cart 300).

In response to detecting the item 402, signals from the sensors 304 can be used to determine the direction the item 402 is moving (406). For example, the gesture sensor 304 can provide signals indicating when an object is detected (e.g., proximity signals indicating when the item 402 is within a threshold distance) and also can provide signals indicating the direction the item 402 is moving. Using various signal processing techniques (e.g., filters, transforms, masks), the directional signals can be reduced to a signal indicating whether the item 402 is entering the cart 300 or being removed from the cart 300.

Once the item 402 is detected, the vision sensors 306 can begin capturing images which, given the item 402 entering or exiting the cart 300, can include capturing images of the item 402 (406). The frequency with which the images can be captured can vary, and can include multiple images (or frames) being captured per second (e.g., 2 images per second, 4 images per second, 10 images per second, 30 images per second).

Optical object recognition can be performed for each of the images that are taken (410). The optical object recognition can use optical product models that correlate optical features of different physical products to product identifications (e.g., product SKUs). Each physical product may have one or more optical product models that are trained, for example, using images taken of the physical product from multiple different vantage points, angles, and different lighting conditions. The optical product models may, for example, be trained based on physically taken images (e.g., images of the physical product rotated around at different angles and under different lighting conditions) and/or based on virtual images generated from product packaging mockups (e.g., images generated from print files for product packaging and configuration). Images from multiple different vision sensors 306 (at multiple different vantage points within the cart 300) can be taken at the same time and can be fed into the object recognition technique with the object recognition model to identify the item 402. Additionally, multiple images from the vision sensors 306 over time can be fed into and used by the object recognition technique to more accurately identify the item 402. The optical product models can correlate various optical product features to varying weights that correspond to how unique those features, alone or in combination with other optical features, are with regard to the corpus of products within a store. For example, unique features, such as bar codes, product names, logos, and/or other combination of features, can have a greater weight associated with a product identifier than other features that are less unique, such as nutrition information, price information, and/or other less unique information. In some cases, visions systems that can be used include machine-learning systems using neural networks including deep neural networks, feature-learning, evolutionary learning, etc.

Package size, shape, and/or volume of an item or items placed can be used to determine item quantity. For example, if a guest places four boxes of pasta into a cart, the vision system could be configured to detect one box of pasta and the volume of the boxes. Using this information, the vision system could determine that the volume placed is four-times greater than a single box of pasta and perform calculations to determine that four boxes have been placed in. Data for this can be senses with multiple depth (i.e. 3D) or a plurality of standard (i.e. 2D) cameras combined to generate volumetric representations of items sensed.

Each item in a store may have an optical product model which, in aggregate, may be too large to evaluate with regard to multiple different images of the item 402 taken at a rate of multiple images per second. As a result, the optical object recognition (410) can include paring down the optical product models that are loaded and evaluated against the images to a likely subset of all available products. For example, the cart 300 (via the controller 314 and/or the mobile device 322) may include location information for the cart 300 within a store. Products that are located in the store near the cart's current location (e.g., within 10 feet, within 20 feet, within 50 feet, within 100 feet, within another threshold distance) may be loaded for evaluation against the images taken by the sensors 306. The optical product models may be, for example, organized according to one or more location-based models (e.g., tree structure, indices) that can be readily searched and used to efficiently identify and load appropriate optical product models.

Based on the optical object recognition, a determination can be made as to whether the technique 400 was able to effectively identify the item 402 (412). For example, a confidence score can be generated from the optical object recognition technique for the corresponding product identification (410), and a determination can be made as to whether that confidence score is at a threshold level to permit for accurate identification (e.g., confidence score is within threshold confidence score).

If the item cannot be identified, then alternate item identification techniques can be used, such as performing an RFID scan with the RFID sensors 310 (414). For example, some products may include RFID tags that can be detected by the RFID sensors 310, which can perform RFID scans to detect the presence of the RFID tags. For example, soft goods (e.g., clothes) that may have non-uniform shapes may be difficult to optically identify. However, such goods may include RFID tags that are detectable via the RFID sensors 310 and, like performing optical scans and product detection, RFID scans may require larger amounts of energy and computing resources, and as a result may only be used in appropriate instances in order to extend the battery life of a mobile power source on the cart 300.

The RFID scan (414) may be additionally complicated by the presence of other items that are already included in the cart 300. For example, each RFID scan may result in the detection of each item already in the cart in addition to the item 402 that has been newly placed in the cart 300. As a result, identifying the new item 402 may include evaluating the existing virtual cart contents for the cart 300 (previously identified via the technique 400) against the current RFID scan to determine whether the new item 402 has been detected via RFID and, if so, what the identity of the product is.

Based on the results of the RFID scan, a determination can be made as to whether the object has been identified (416). If the product has been identified via either the optical object recognition (412) or via the RFID scan (416), then a determination can be made as to whether the identified product is being placed into or removed from the cart (418). For example, the directionality from the step 406 can be used to make this determination. If the product is being placed into the cart, then the identified product can be added to the virtual cart (420), which can be displayed on the user's mobile device 322. If the item is being removed from the cart 300, then the identified product can be removed from the virtual cart (422). Notifications for the addition (420) and removal (422) of products can be presented on a user interface for the mobile device 322, and can include features permitting users to indicate that the automatic identification is incorrect and permitting corrective action to be taken. In the event that corrective action is taken, the cart 300 and its corresponding virtual cart may be limited to going through a checkout lane (restricting the cart 300 from being checked out via the mobile device 322) and/or may be required to perform one or more added security checks (e.g., check at door) in order to verify the contents of the cart.

In the event that the item 402 is unable to be optically detected or identified via an RFID scan, then a request for a manual scan can be presented on the user device 322 (424). For example, a notification can be presented on the user device 322 to notify the user that the automatic detection was unsuccessful, and to request that the user scan a barcode (or other optical code, such as a QR code) for the item 402 using the mobile device 322. The manual scan can cause the item 402 to be added to (or removed from) the user's virtual cart, similar to steps 420 and 422.

The technique 400, in whole or in part, can be performed locally on the cart 300 by the controller 314 and/or the mobile computing device 322. In some instances, the technique 400 can additionally be performed with the aid of one or more computing devices and/or systems that are remote from the cart 300, such as an in-store server system and/or one or more remote server systems (e.g., cloud based computer systems).

The technique 400 is used for detecting products that are being placed in and removed from portions of the cart 300 that include combinations of the sensors 304, 306, and 310. Other areas of the cart 300 that may not include the full sensor array, such as the front basket area adjacent the sensor 302 and/or the bottom rack area monitored by the cart-bottom sensor 308, can use alternate techniques. For example, the sensor 302 may be used to detect items being placed into and/or removed from the adjacent area of the cart, which may trigger an RFID scan to be performed and, if unsuccessful, may prompt a manual scan. The cart-bottom sensor 308 may be used in similar ways.

Figure 5A:
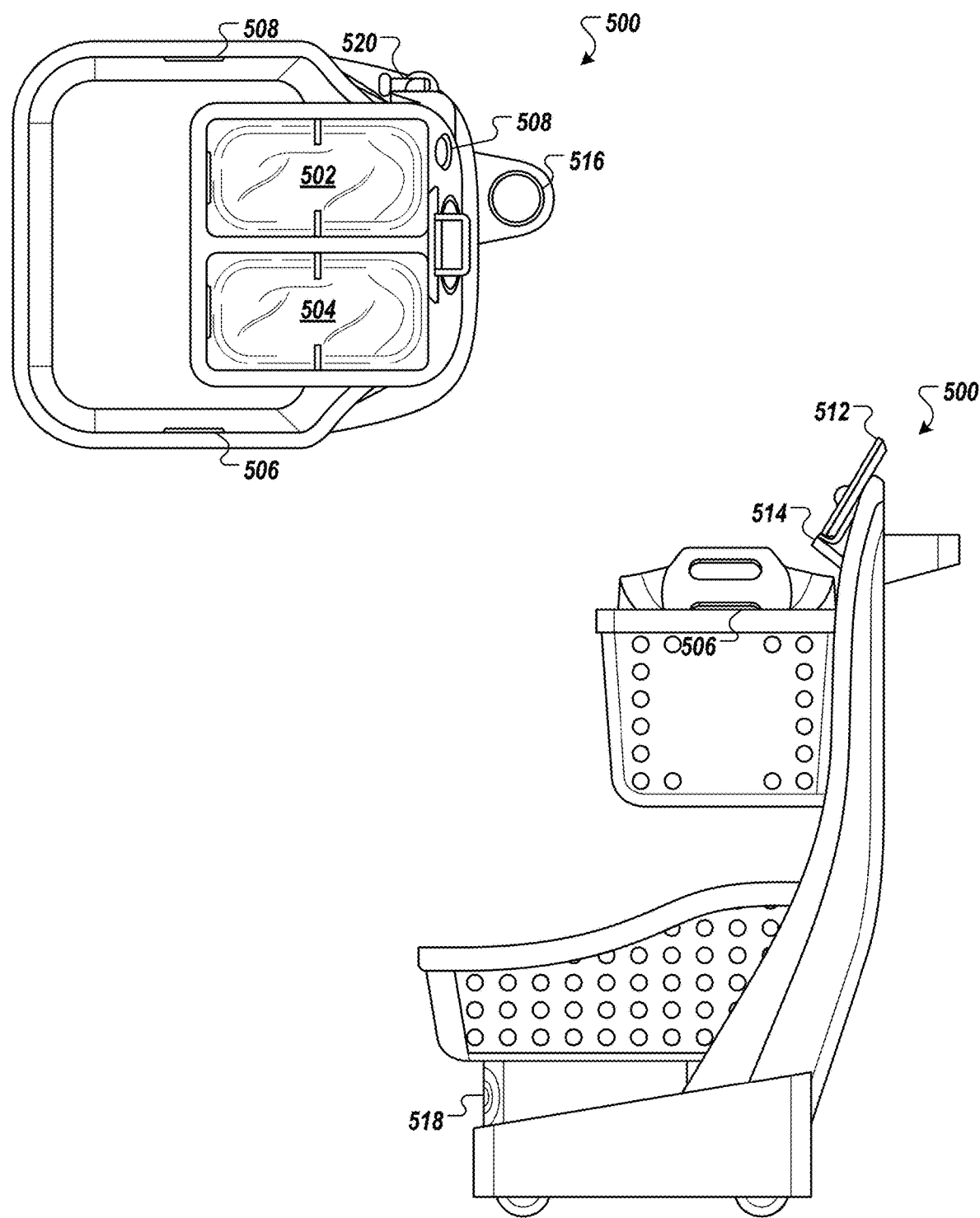
FIGS. 5A and 5B are examples of a physical shopping cart having features for detection of items placed into the physical shopping cart.
Figure 5B:
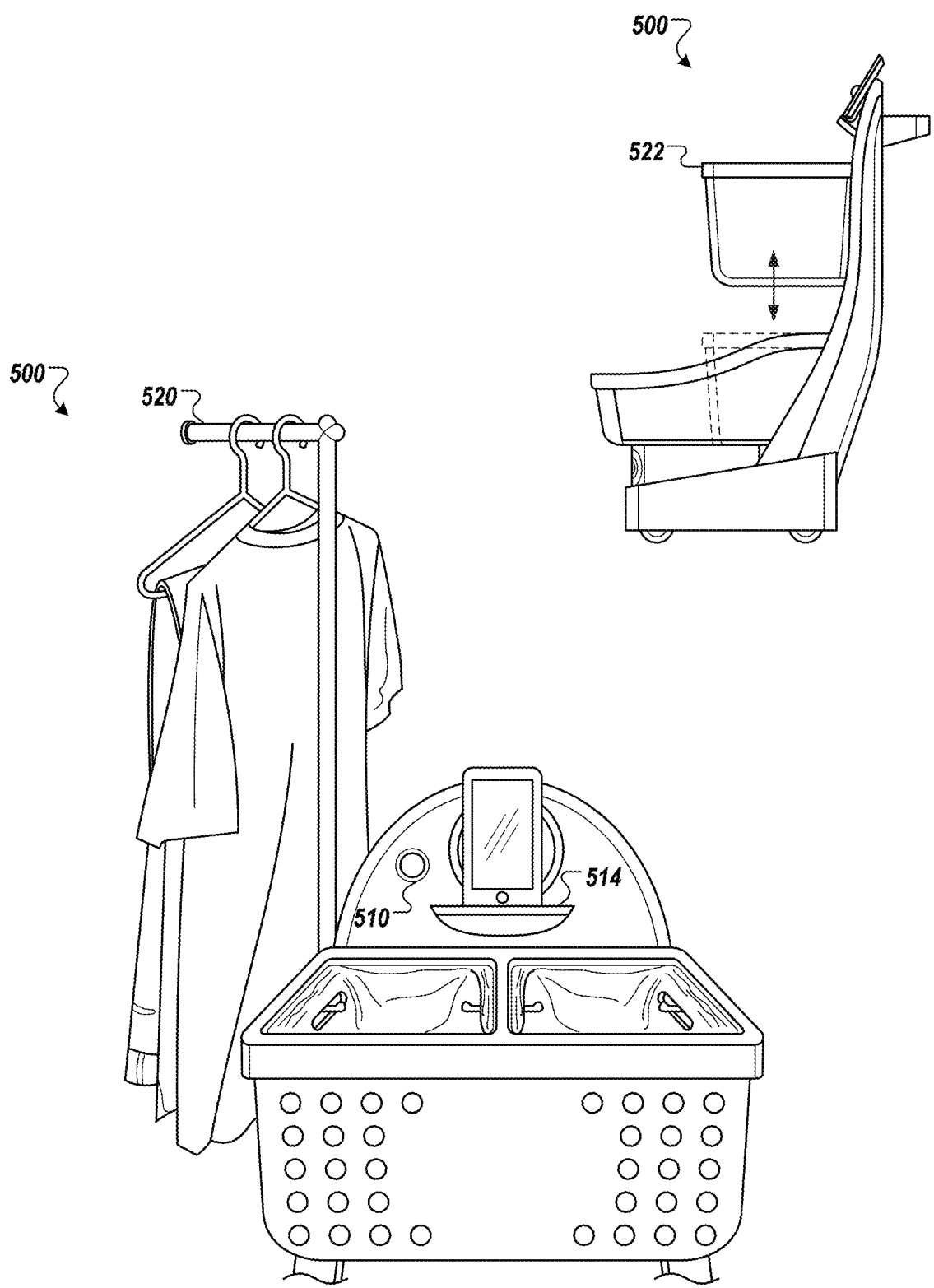

FIGS. 5A and 5B are examples of a physical shopping cart 500 having features for detection of items placed into the physical shopping cart. The physical shopping cart 500 can include elements (not shown) to track items placed into the physical shopping cart 500, such as a handheld scanner or sensor to automatically detect an item passing through a sensor plane at an opening of a basket of the physical shopping cart 500.

The physical shopping cart 500 can include bagging compartments 502 and 504 in a basket. Similar to as described above, these bags may be mounted in a mounting instrument and ready to receive an item placed by a user. As the user places the item into the bag, the item can be recognized by the physical shopping cart 500 using sensors 506 and 508 that create a sensor plane in the entrance to the basket.

Output to a user can be provided through light elements 510 and 512. The lighting elements 510 and 512 may include, for example, red and green lights such as light emitting diodes (LEDs) that activate to indicate to a user when certain events happen. These events can include, for example, a green light when an item is successfully recognized and a red light when an item is placed into the physical shopping cart 500 but not recognized successfully.

A mobile computing device 512 can physically mount to the physical shopping cart 500 when placed in a mounting fixture 514. Before or as part of physically mounting the mobile computing device 512 in the mounting fixture 514, the mobile computing device 512 can be logically paired with the physical shopping cart 500. In some cases, the mounting fixture 514 includes a charger configured to charge the mobile computing device 512 while mounted.

A secondary mounting fixture 516 can be adapted to receive another item. For example, the secondary mounting fixture 516 can include a circular through-hole with chamfered or angled side-walls to receive and hold a beverage. In another example, the secondary mounting fixture 516 can be adapted to receive a scanner logically paired with the physical shopping cart 500.

One or more environmental sensors 518 can be configured to sense the environment and/or the physical shopping cart's 500 location within the environment. For example, the physical shopping cart 500 can sense the location of the user and other humans in the environment. This sensing may be used by the physical shopping cart 500 to autonomously navigate in the environment, to follow the user, to move itself to a staging area, to lead the user to a particular product in a store environment, etc.

A folding, telescoping rack 520 may be included in the physical shopping cart. This rack 520 may be folded and stowed within the physical shopping cart 500 when not in use, and then configured to be accessible when in use. A user may hang items on the rack 520 instead of placing the items into the physical shopping cart 500. In order to sense the items, the rack 520 can include one or more sensors. For example, an RFID sensor may be embedded in the rack 520 in order to sense items hung from the rack 520.

As shown in FIG. 5B, one or more baskets 522 may be locationally adjusted. In this example, the basket 522 is able to slide vertically, into an upper locked-position and into a lower locked-position. This can allow the customer to adjust the physical shopping cart 500 into a comfortable configuration for use while shopping.

Features available in the physical shopping cart 500 include, but are not limited to, tracking steps while shopping, paging a retail employee for assistance, showing details of the nearby environment, locating and routing to a requested item in the retail environment, entertainment such as video games or entertainment video, and personalized offers based on guest preference and proximity to products.

Figure 6A:
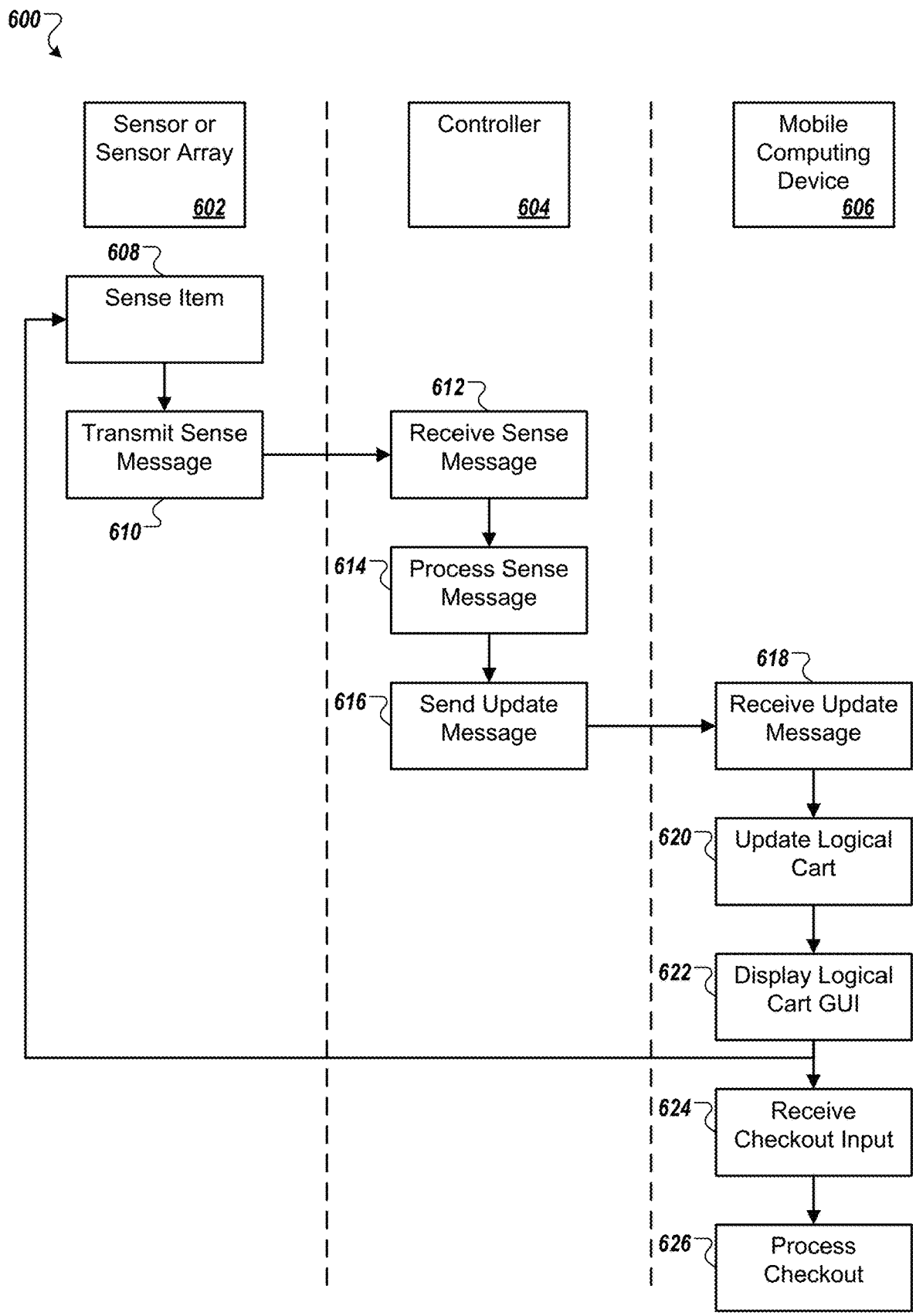
FIGS. 6A, and 6B are examples of processes for completing a shopping transaction using a physical shopping cart and a mobile computing device.

FIG. 6A is an example swimlane diagram of a process 600 for completing a shopping transaction using a physical shopping cart and a mobile computing device. The process 600 can be completed by, for example, a sensor or sensor array 602, a controller 604, and a mobile computing device 606. For example, the sensor array 602 may include a gesture sensor, a computer vision sensor, and an RFID sensors. The controller 604 may include a data processor and computer memory. The mobile computing device 606 may include a phone, a table, or other mobile computing device.

An item is sensed 608. For example, a customer walking through a retail store, the customer can browse for an item they would like to purchase. Eventually, the customer finds ajar of pickles that they would like to purchase, and places the pickles into their shopping cart.

The customer's physical shopping cart has been configured with the sensor array 602 so that, when a physical object passes through an entrance area of the cart, the item also passes through a sensor plane monitored by the sensor array 602. As such, when the jar of pickles and the customers arm pass through the sensor array, the sensor array 602 can sense and identify the jar of pickles. For example, a gesture sensor in the sensor array 602 can identify a gesture of an item entering the cart. A vision sensor can sense visible and/or non-human-visible light energy to capture an image of the pickle jar. An RFID sensor can sense an RFID tag in or on the pickle jar, if one such RFID tag is present.

This sensing can generate one or more data messages, which will be referred to as sense-messages. In this example, a gesture sensor of the sensor array 602 can generate a sense-message indicating a sensing of a gesture into the cart. Responsive to this gesture sense-message, a computer vision sensor in the sensor array 602 can capture an image of the jar of pickles as it is being placed into the cart and a vision sense-message containing the image can be generated.

A sense-message is transmitted 610 and the sense-message is received 612. For example, the sensor array can send the gesture sense-message and the vision sense-message can be sent from the sensor array 602 to the controller 604. In some examples, sensors of the sensor array 602 can send sense-messages directly to the controller 604 along, e.g., a wired or wireless data channel. In some cases, an intermediary element such as senor controller can be configured to route, generate, and/or modify data so that the sense-messages reach the controller 604 in a format usable by the controller 604. In some cases, only some of the sensor events may be sent as sensor-messages. For example, in some examples, only the visions event may generate a sense-message, with the gesture sensor generating only a command to the vision sensor to activate.

The sense-message is processed 614. For example, the controller 604 can process the sense messages received in order to identify the pickle jar as the item that was placed into the cart. This processing may take different forms based on the kind of sense-message used or received.

In a case with a vision sense-message, the controller may perform vision analysis to the vision sense-message in order to identify the time (i.e., the pickle jar). For example, the controller 604 may apply image recognition algorithms to the vision sense-message in order to determine if the image matches any of a plurality of stored images associated with different items. In this example, the controller 604 can determine that the vision sense-message matches a stored image of the pickle product, and the controller 604 can thus determine that the pickle jar was added to the cart.

In a case with an RFID sense-message, the controller may perform a look-up to a look-up table using an identifier from the RFID tag. This look-up table can be configured to associate the identifier with the pickle product, and the controller 604 can determine that the RFID sense-message matches a stored image of the pickle product, and the controller 604 can thus determine that the pickle jar was added to the cart.

In some cases, the processing 614 can be performed completely by the controller 604 without the assistance of another computing device. For example, the controller 604 may have sufficient hardware (e.g., data processor, computer memory) and software/data (e.g., a vision recognition system, a library of images of known products, and a table mapping the images to information about the products). In this example, the controller 604 is able to identify the pickle product without further data communication to another data processing device. This may be advantageous, for example, to allow for flexible scaling of physical shopping carts within a store, with each new shopping cart bringing along the computing power needed to handle the physical shopping carts computing workload.

In some cases, other information can be used to aid in the process 614. For example, cart location can be tracked with one or more sensor types and used in the process 614. In some cases, guest location and dwell time can be used an indicator of guest intent. A cart near a particular product type can be used to increase the confidence that a particular product is identified, or to prune out items that are not near the cart.

In some cases, the processing 614 can be performed by the controller 604 in conjunction with another computing device. For example, the controller 604 may transmit some data (e.g., an image of the pickle jar) to an off-shopping-cart computing device (e.g. a server managed by the store and physically located separate from the physical shopping cart) for some of the processing. This may be advantageous, for example, to allow for a single point-of-contact for updates to product information within a store. In some cases, performing the process 614 wholly or partly with an off-shopping-cart computing device can be used to increase the battery life of the cart, provide faster or higher accuracy item detection by use of greater computing resources, and better adjustments to identification algorithms based on a larger stream of data. In some cases, performing the process 614 entirely on the shopping cart can provide for less chance of delays due to faulty network connections, reduced costs by not requiring the off-shopping-cart computer, and reduced complexity.

An update-message is sent 616 and the update-message is received 618. For example, the controller 604 can send the update-message to a paired mobile computing device 606 owned by the shopper.

In some cases, an application on the mobile computing device can manage the shopping session. For example, this application may allow a user to log into a personalized account, add payment information (e.g., a credit or debit card, connect to a financial account, record a cryptocurrency address), and begin a shopping session. This shopping session may include pairing with the physical shopping cart and/or mounting the mobile computing device on the physical shopping cart. Then, as the user places items into the physical shopping cart, the controller 604 can send update-messages to the mobile computing device 606.

For example, the controller 604 can send an update-message to the mobile computing device 606 via a wireless data channel (e.g., Bluetooth, Bluetooth Low Energy, Zig-Bee, or an 802.11 protocol.) This update-message can include information about the type of item (e.g., the pickle product), a count of the item (e.g., one in this case), and other information such as RFID Electronic Product Code (EPC,) barcode, coupon code, price, discount, location within store, date, and/or time.

The logical cart is updated 620. For example, the application on the mobile computing device 606 can maintain a logical shopping cart that is a data construct that mirrors the state of the physical shopping cart that the user is using. When the pickle jar is added as the first item to the physical shopping cart, the mobile computing device 606 can update the logical shopping cart to go from an empty state to a state in which the logical shopping cart contains a record of a single pickle product. Later, when the customer adds a bottle of mustard to the physical shopping cart and an update-message is received to indicate the added mustard, the mobile computing device 606 can add a record of the mustard to the logical shopping cart. When the user in this example removes the mustard from the physical shopping cart and an update-message indicating a reduction of one to the mustard product, the mobile computing device 606 can reduce the count of the mustard product and/or remove the mustard product from the logical shopping cart.

The logical cart is displayed in a graphical user interface (GUI) 622. For example, the application running on the mobile computing device 606 can generate a GUI displayed on the display of the mobile computing device 606. The GUI can include user interface elements to, for example, initiate a shopping session, bring up information about the store, complete the shopping session by checking out, and view the contents of the logical shopping cart.

To display the logical shopping cart, the mobile computing device 606 can graphically display a list of items in the logical shopping cart. Checkout input is received 624. For example, the user can select a user interface element (e.g., a button) to begin the checkout process for their shopping experience. This checkout input can include user authentication (e.g., entering a password or personal identification number (PIN), supplying biometric information like a fingerprint) and permission validation (e.g., asking the user to approve payment with a particular payment method).

The checkout is processed 626. For example, the mobile computing device 606 can finalize the logical shopping cart, preventing the addition or subtraction of items. The mobile computing device 606 can prompt the user to approve the list of items in the logical shopping cart, with the option to remove any unwanted items, etc. The mobile computing device, e.g., once the items to be purchases are confirmed, can initiate a financial transaction to charge the method of payment, can generate a receipt to be printed or provided in electronic format, and inform the user that their checkout is complete. At this point, the user may remove their purchased jar of pickles from the cart, which may have been bagged in a bag dispenser within the cart, and exit the store.

Figure 6B:
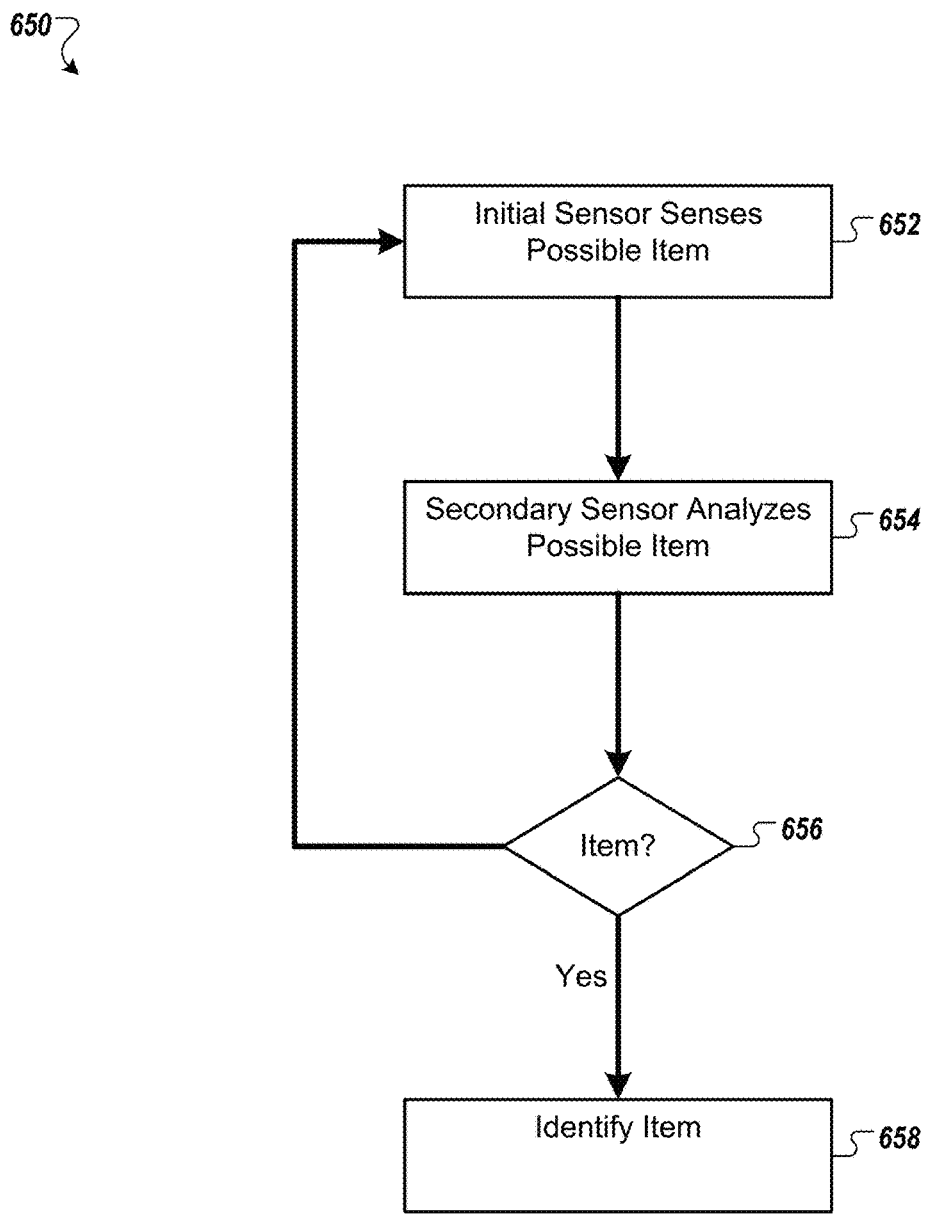

FIG. 6B is an example flowchart of a process 650 for sensing an item. For example, the process 650 can be used as part of completing the sensing of an item 608 in the process 600.

An initial sensor senses a possible time 652. For example, the initial sensor can include one or more sensors that are configured to sense for an indication of the presence of an object in a physical shopping cart without necessarily confirming that it is an item for sale that is to be identified. That is, the initial sensor may sense when anything is put into the cart, be it an item for sale such as the jar of pickles or some other item like the user's arm or the jacket they brought with them into the store. An example of such a sensor is a gesture sensor such as gesture sensor 302, which can identify presence and direction, but not necessarily the identity of an item. An example of such a sensor is a contact or weight sensor that is able to sense pressure of an item in contact with the physical shopping cart.

A secondary sensor analyzes the possible item 654. For example, the secondary sensors may normally be in a powered-down or sleep mode. Responsive to the initial sensor sensing 652, the secondary sensor may be activated to analyze the possible item sensed by the initial sensor. By normally keeping the secondary sensor in a lower-power state, the power-source for the physical shopping cart can be preserved compared to keeping the secondary sensor sensing at all time.

An example of the secondary sensor includes a vision sensor such as the vision sensor 306. In this example, the vision sensor can capture one or more images of the possible item in response to the primary sensor sensing the possible item. Another example of a secondary sensor is an active RFID sensor that uses energy from a power source to generate an electromagnet field used to sense RFID tags.

If the possible item is determined to be an item 656, the item is identified 658. For example, the information collected by the secondary sensor may be analyzed to determine if the possible item is an item of interest (e.g., an item for sale in the retail environment) or an item not of interest (e.g., the user's jacket that is not for sale and thus not needed for the shopping transaction). In the case of a vision sensor, the collected images can be examined with an appropriate vision-processing algorithm to determine if any of a known set of items-for-sale match. In the case of an active RFID sensor, perturbations of the electromagnetic field can be examined to determine if they have been created by an RFID tag. If such a match is found, the matching item can be used, for example, in the sense-message of 610.

If the possible item is determined to not be an item 656, the initial sensors monitors for a future possible item 652. For example, if the images are determined not to show an item for sale, or if the RFID sensor does not detect appropriate perturbations, the process can determine that the object that was sensed by the primary sensor was not an item for sale, and the physical shopping cart can remain ready to sense an item that will be placed in the physical shopping cart.

Figure 7:
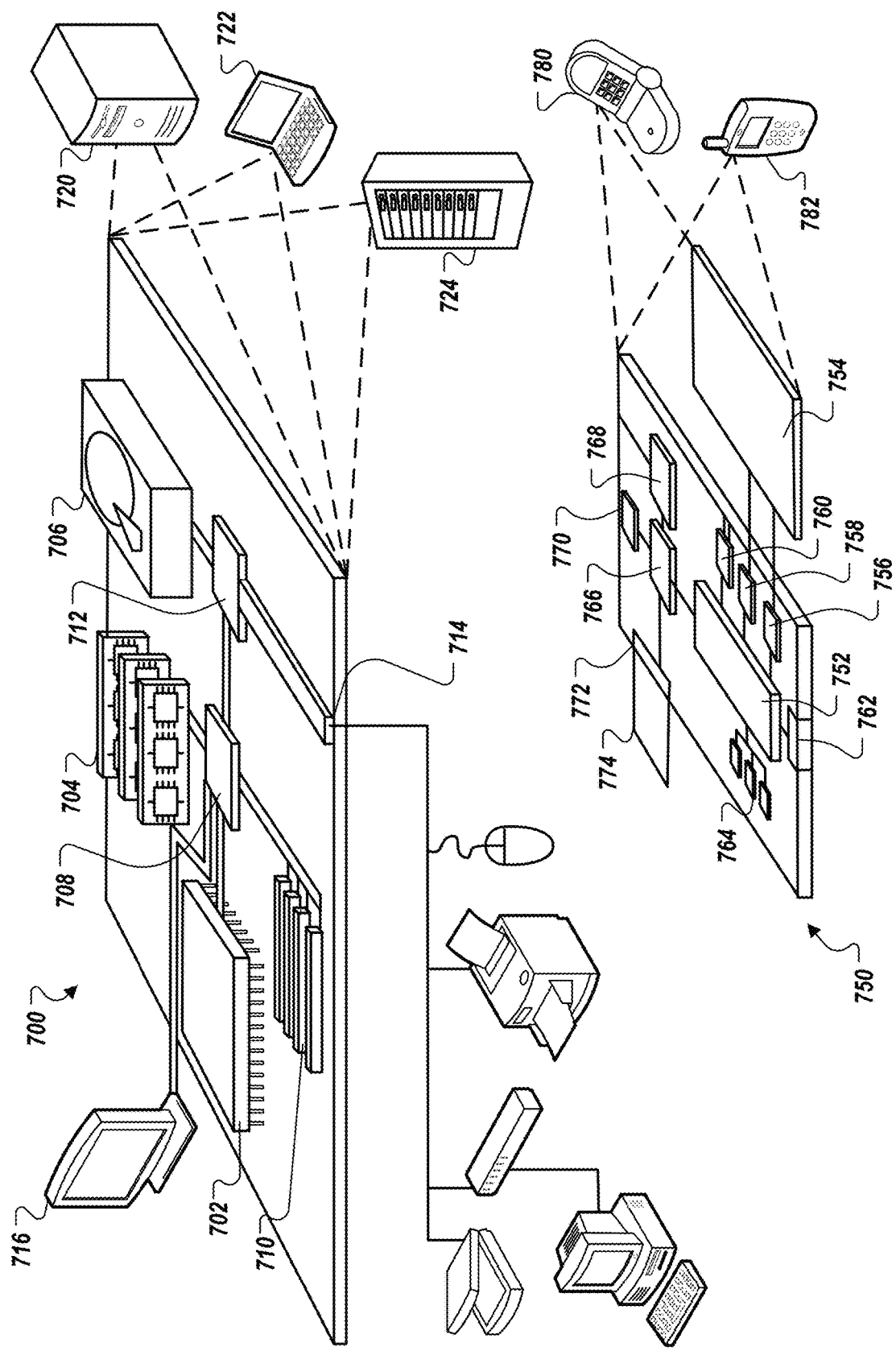
FIG. 7 is a schematic diagram that shows an example of a computing system.

FIG. 7 shows an example of a computing device 700 and an example of a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Figure 8A:
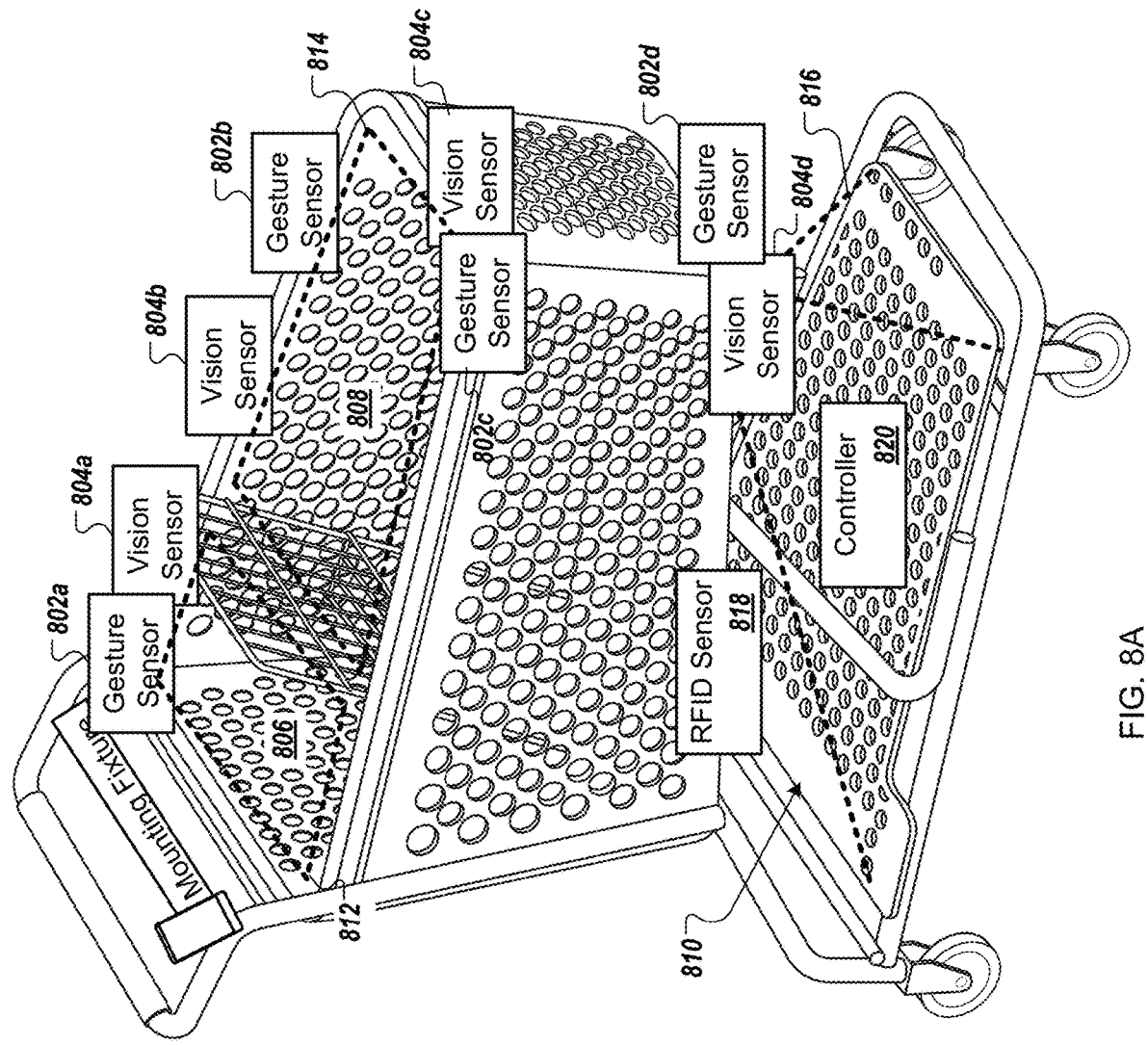
FIGS. 8A and 8B are additional examples of a physical shopping cart having sensors to automatically detect items placed in the shopping cart.
Figure 8B:
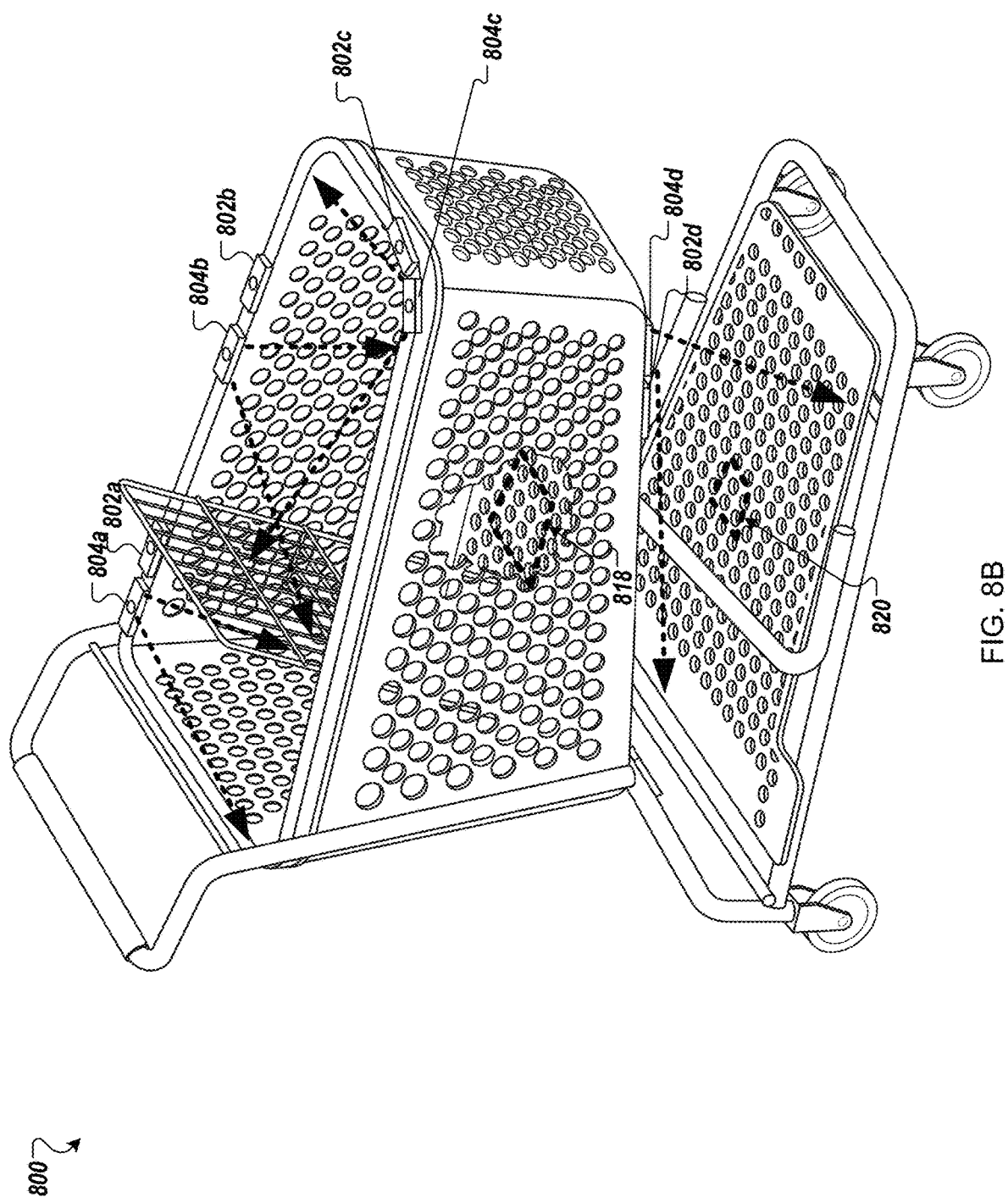

FIGS. 8A and 8B are additional examples of a physical shopping cart 800 having sensors to automatically detect items placed in the cart. The example shopping cart 800 and its depicted sensors can be similar to the cart 300 described above with regard to FIGS. 3A-B, but with some distinct differences. In particular, the gesture sensors 802a-d can be paired with vision sensors 804a-d, including in auxiliary area 806, the main area 808, and the undercart area 810. By pairing gesture sensors 802a-d with visions sensors 804a-d, separate and detection distinct planes/zones 812, 814, and 816 can be monitored by different groups of sensors. For example, items placed in the auxiliary area 806 can be initially detected by the gesture sensor 802a, which can prompt image capture by the corresponding vision sensor 804a for the auxiliary area 806. Similar pairings of gesture sensors and vision sensors can be used to monitor the planes/zones 814 and 816. The benefit of pairing gesture and vision sensors with each other to establish separate and independently operable zones is, for example, that it can increase the robustness of automatic product detection (e.g., automatic product detection is not limited to just the main area 808). This can, as a result, decrease the amount of prompting/user action that is required to ensure that all items placed in the cart 800 properly scanned, either though automatic detection/scanning or through manual scanning, which can increase the robustness of the technical solution that is provided by the cart 800.

Another difference over the sensor arrangement described above with regard to FIGS. 3A-B is the positioning of the sensors and other components along the cart 800. For example, in the main area 808 a first pair of gesture and vision sensors 802b, 804b can be placed along a side of the cart so that they are facing laterally across the cart 800. A second pair of gesture and vision sensors 802c, 804c can be placed in an opposing far corner of the cart 800 so that they are facing diagonally back toward the first pair of sensors. By having the diagonally opposing offset vantage points of the first pair of sensors 802b, 804b and the second pair of sensors 802c, 804c, the plane 814 for the main area can be better and more robustly covered by the sensors so as to avoid missing items being placed in the main area 808, regardless of the direction from which or the location of the main area 808 into which items are placed. For instance, referring to FIG. 8B, while the generally diagonally offset vantage points of the first pair of sensors 802b, 804b and the second pair of sensors 802c, 804c in the main area 808 overlap to some extent, they provide coverage for the entirety of the main area 808 of the cart 800. While there are not multiple pairs of sensors depicted as being used in the auxiliary area (one pair of sensors 802a, 804a) or the undercart area (one pair of sensors 802d, 802d), these areas can be more constrained and, as a result, may be adequately covered by a single pair of sensors. In some implementations, multiple pairs of sensors may be used in these areas as well, and they may also used offset and partially overlapping vantage points so as to ensure adequate coverage of the area being scanned.

Another difference from the sensor arrangements described above with regard to FIGS. 3A-B is that, in the examples depicted in FIGS. 8A-B, the RFID sensors 818 and the controller 820 can be secured to the underside of portions of the cart 800, so as to avoid damage, tampering, or other actions being performed to these components that would potentially frustrate operation of the cart 800. For example, the RFID sensors 818 can be affixed to and/or embedded within an underside of the main area of the cart 800, as indicated by the dashed lines in FIG. 8B. By positioning the RFID sensors 818 at, near, or otherwise around a centroid of the volume of the shopping cart 800, which may store goods, the RFID sensors 818 can be best positioned to capture RFID signals reflected back from items placed in any part of the cart 800, including the auxiliary area 806 and the undercard area 810. Similarly, the controller 820 can be affixed to and/or embedded within an underside of the shelf that forms the floor/surface of the undercart area 810, as indicated by the dashed lines representing the controller 820 in FIG. 8B. By positioning the controller 820 in such a location, which may be the area of the cart 800 that is least likely to be contacted, touched, or otherwise manipulated by a user of the car 800, the cart 800 can protect against damage, tampering, and/other actions that could negatively affect the controller 820.

The sensors 802a-d, 804a-d, 818 and other components (e.g., controller 820) described with regard to FIGS. 8A-B can be the same as or similar to the sensors and other components described above with regard to FIGS. 3A-B. For example, the gesture sensors 802a-d can include proximity sensors, distance sensors, laser sensors (e.g., tripline sensors), and/or other sensors that can detect movement and, in some instance, directionality of the movement. For instance, the gesture sensors 802a-d can include hardware capable of discerning the direction of a gesture.

In some cases, the sensors of the physical shopping cart 800 can be incorporated into sensor pods as described with respect to the physical shopping cart 350 in FIG. 350. For example, the gesture sensor 802a and vision sensor 804a can be housed in a single sensor pod 352, while the gesture sensor 802b and vision sensor 802b can be housed in a single sensor pod 354.

Figure 9:
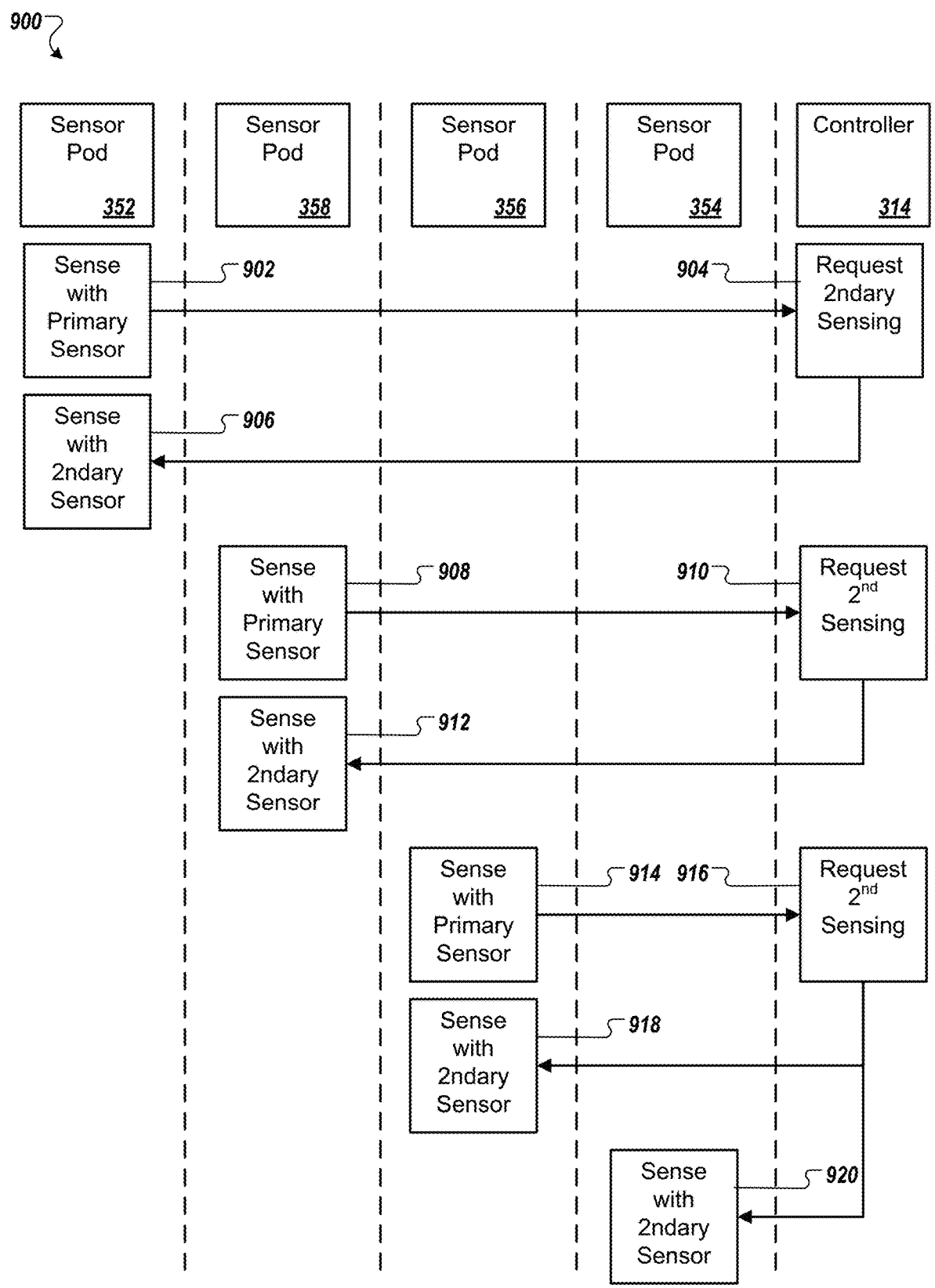
FIG. 9 is an example of a processes for completing a shopping transaction using a physical shopping cart and a mobile computing device.

FIG. 9 is an example flowchart of a process 900 for sensing an item. For example, the process 900 can be used as part of completing the sensing of an item 608 in the process 600. The process 900 can be completed by, for example, the sensor pods 352-358 and the controller 314.

The sensor pod 352 senses, with a primary sensor, an item placed into a physical shopping cart 902. For example, the sensor pod 352 may include a gesture sensor that senses when a physical object moves near the sensor pod 352. In response to registering this movement, the sensor pod 352 can send, to the controller 314, a sensor signal indicating that the primary sensor the—gesture sensor—has sensed a new item.

The controller 314 can request secondary sensing 904. For example, the controller 314 can, in response to receiving the sensor signal, determine that the sensor signal likely indicates a new item. The controller, for example, may determine if any sensor signals have been received from the sensor pod 352 within a threshold period of time. If no such sensor signals have been received (i.e. if there has been no activity for a period of time), this may be interpreted by the controller 314 as a new activity and the secondary sensing request may be sent. If one or more sensor signals have been received (i.e., there has been activity recently), this may be interpreted by the controller 314 as a product of the same item placement as that which produced the recent sensor signals.

The sensor pod 352 senses with a secondary sensor 906. For example, responsive to receiving the request for secondary sensing from the controller 314, the sensor pod 352 can engage an image capture sensor to capture one or more images of the item or items being placed into the area 318.

The sensor pod 358 senses, with a primary sensor, an item placed into a physical shopping cart 908. For example, the sensor pod 358 may include a proximity sensor that senses the proximity of the nearest item to the sensor pod 358. In response to registering a change in proximity, the sensor pod 358 can send, to the controller 314, a sensor signal indicating that the primary sensor—the proximity sensor—has sensed a new item.

The controller 314 can request secondary sensing 910. For example, the controller 314 can, in response to receiving the sensor signal, determine that the sensor signal likely indicates a new item. The controller, for example, may determine if any sensor signals have been received from the sensor pod 352 within a threshold period of time. If no such sensor signals have been received (i.e. if there has been no activity for a period of time), this may be interpreted by the controller 314 as a new activity and the secondary sensing request may be sent. If one or more sensor signals have been received (i.e., there has been activity recently), this may be interpreted by the controller 314 as a product of the same item placement as that which produced the recent sensor signals.

The sensor pod 358 senses with a secondary sensor 912. For example, responsive to receiving the request for secondary sensing from the controller 314, the sensor pod 358 can engage an RFID sensor to capture one or more RFID identifiers of the item or items being placed into the cart bottom 316.

The sensor pod 356 senses, with a primary sensor, an item placed into a physical shopping cart 914. For example, the sensor pod 356 may include a laser sensor that senses when a physical object breaks a laser curtain that is projected onto the sensor pod 356. In response to registering this object breaking the laser curtain, the sensor pod 356 can send, to the controller 314, a sensor signal indicating that the primary sensor the—laser sensor—has sensed a new item.

The controller 314 can request secondary sensing 916. To do so, the controller 314 can request secondary sensing from each sensor pod 354 and 356 that is associated with the area of the sensor pod 356. For example, the controller 314 can, in response to receiving the sensor signal, determine that the sensor signal likely indicates a new item. The controller, for example, may determine if any sensor signals have been received from the sensor pod 354 or 356 within a threshold period of time. If no such sensor signals have been received (i.e. if there has been no activity for a period of time), this may be interpreted by the controller 314 as a new activity and the secondary sensing request may be sent. If one or more sensor signals have been received (i.e., there has been activity recently), this may be interpreted by the controller 314 as a product of the same item placement as that which produced the recent sensor signals.

The sensor pod 356 senses with a secondary sensor 918. For example, responsive to receiving the request for secondary sensing from the controller 314, the sensor pod 356 can engage an image capture sensor to capture one or more images of the item or items being placed into the main area 318.

The sensor pod 354 senses with a secondary sensor 920. For example, responsive to receiving the request for secondary sensing from the controller 314, the sensor pod 358 can engage an image capture sensor to capture one or more images of the item or items being placed into the main area 318.

In order to request the secondary sensing, the controller 314 may be configured to look up, in a table stored in computer memory, the correspondence between the sensor pods 352-358 and areas 316-318. For example, for this configuration of the cart used in this example, the table may associate the sensor 352 with the auxiliary area 320, the sensors 354 and 356 with the main area 318, and the sensor 358 with the cart bottom 316. Based on this correspondence accessed by the controller, the controller 314 can determine which sensor pods 352-358 to request secondary sensing from. For example, any time any sensor signal is received for a particular area of the cart, the controller 314 may request secondary sensing from all sensor pods associated with that area of the cart.

Figure 10A:
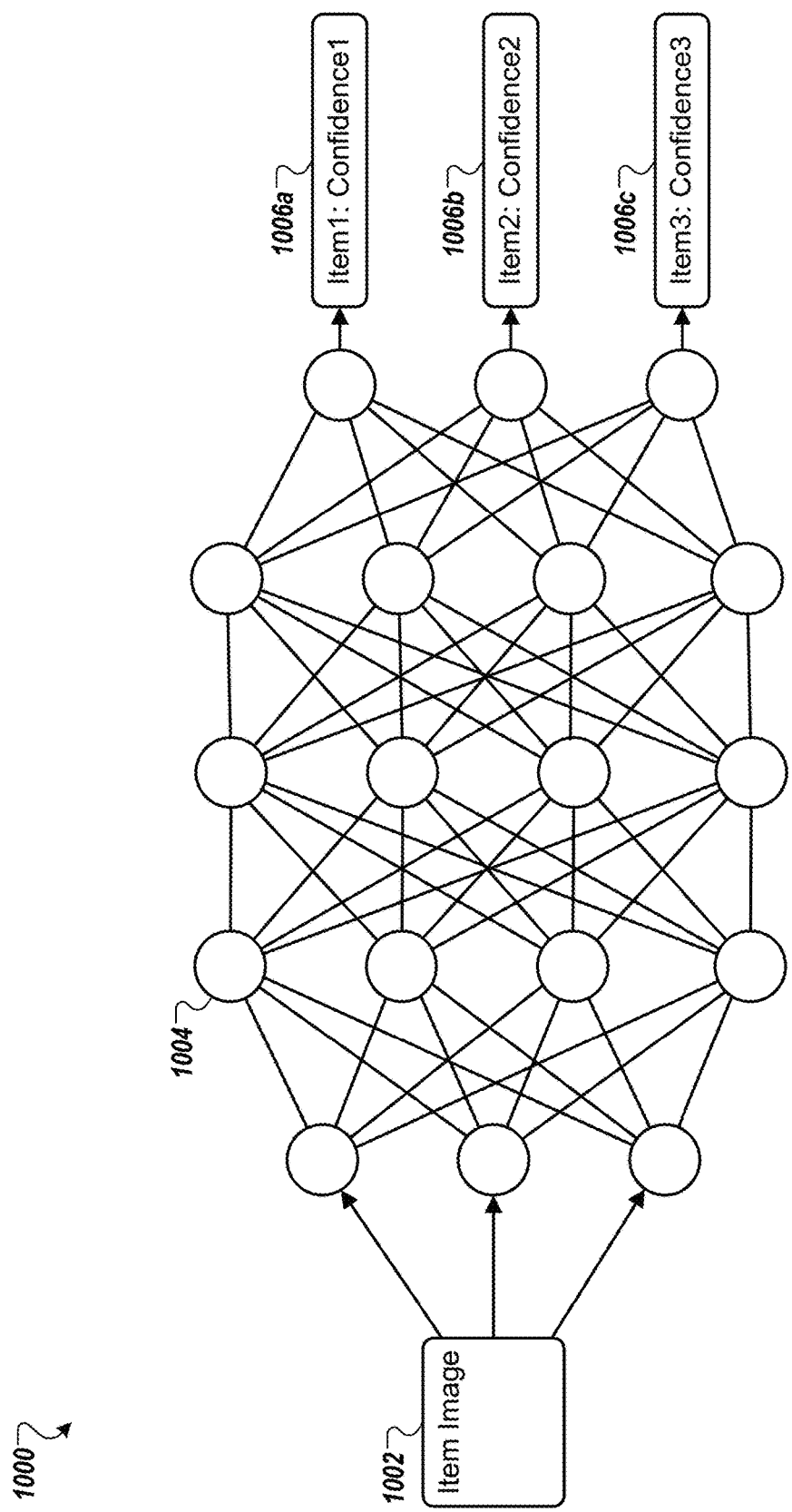
FIG. 10A is an example of a machine-learning system for generating confidence values for images of items.

FIG. 10A is an example of a machine-learning system 1000 for generating confidence values for images of items. In the system 1000, an item image is submitted to a neural network 1004. The neural network 1004 has been trained on image:tag pairs of training data that record pre-recorded images of various items with an identifying tag. The identifying tag may be a name, a unique identifier, etc. As such, the neural network 1004 is configured to produce, for each input item image 1002, confidence values 1006 that record a confidence that the item image 1002 shows various items. For example, the confidence level 1006a is a confidence that the item image 1002 shows a first item (item1) and confidence level 1006b is a confidence that the item image 1002 shows a second item (item2), etc.

Figure 10B:
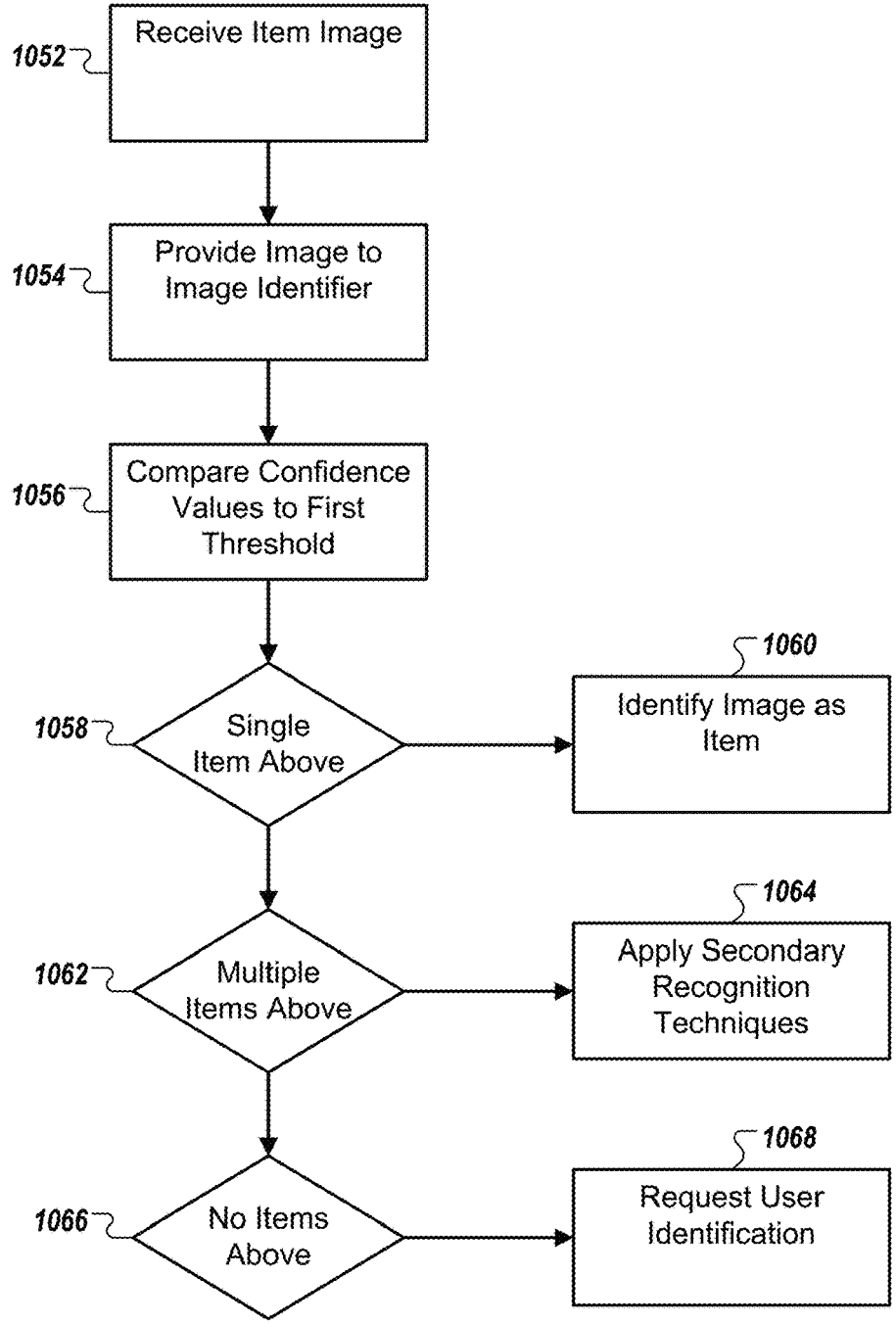
FIG. 10B is a flowchart of an example technique for automatically identifying items placed in a shopping cart.

FIG. 10B is a flowchart of an example technique 1050 for automatically identifying items placed in a shopping cart. The technique 1050 can be performed using the machine-learning system 1000 and other elements described in this document.

An item image is received 1052. For example, the user may place an item in the auxiliary area 806, and the gesture sensor may send to the controller 820 a sensor signal. The controller 820 can send to the vision sensor a command to capture one or more images that are returned to the controller 820.

The image is provided to an image identifier 1054. For example, the controller 820 can provide the received images to the neural network 1004 for classification. The neural network can process the images to generate a confidence score for each of a collection of possible items that are available for purchase in the store that contains the physical shopping cart. In some cases, this may be a list of all items for sale, or it may be a pruned list of, for example, only items expected to be on a shelf within a particular distance of the physical shopping cart.

Confidence values are compared to a first threshold value 1056. For example, the controller 820 can compare each of the confidence values 1006 against a particular, predetermined value that has been selected to represent a confidence at which a classification by the neural network 1004 is expected to be accurate.

If a single item has a confidence value greater than the first threshold value 1058, the image is identified as containing an item 1060. For example, if confidence score 1006a is above the first threshold value while confidence scores 1006b and 1006c are below the first threshold value, then the item associated with the confidence score 1006a can be considered identified in the image.

If multiple items have a confidence value greater than the first threshold value 1062, the secondary recognition techniques are applied 1064. For example, if confidence scores 1006a and 1006b are above the first threshold value while confidence score 1006c is below the first threshold value, then secondary recognition techniques can be used. Examples of such secondary techniques include, but are not limited to, scanning of barcodes, character recognition, selecting the item with a shelf location closest to the physical shopping cart, etc.

If no item has a confidence value greater than the first threshold value 1066, user identification is requested 1068. For example, a user can be promoted on a user device to select the item from a list of possible or all items available.

Figure 11:
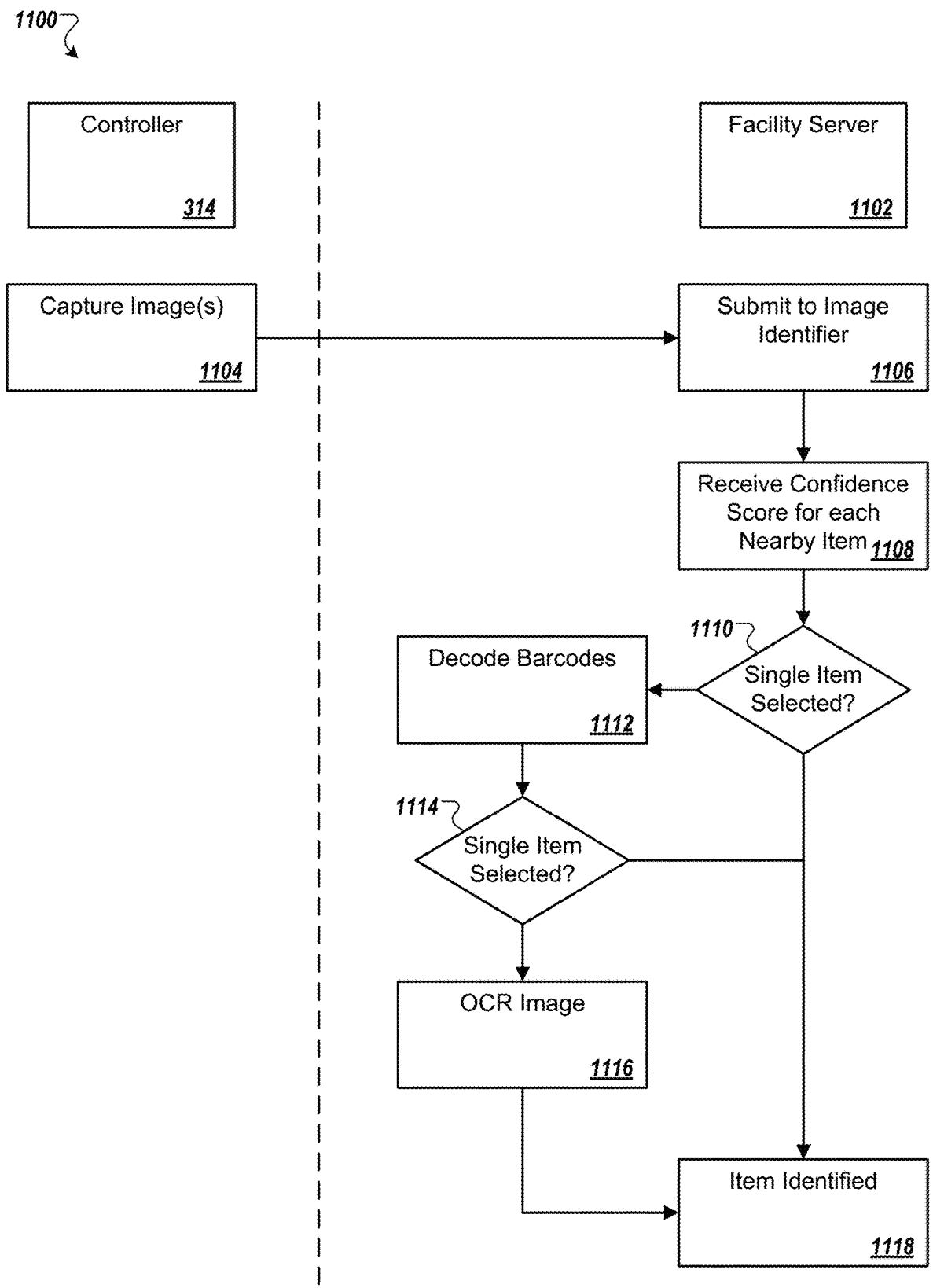
FIG. 11 is a swimlane diagram of an example technique 1100 for automatically detecting items placed in a shopping cart.

FIG. 11 is a swimlane diagram of an example technique 1100 for automatically detecting items placed in a shopping cart. For example, the process 1100 can be used as part of completing the performance of optical object recognition. The process 1100 can be completed by, for example, the controller 314 working with a facility server 1102.

The facility server 1102 is one or more computer devices that are configured to act as a server to handle request from physical shopping carts, including the physical shopping cart 300 that are associated with a physical facility. The facility server 1102 may also provide network access to computer resources and services such as authentication, database access, and the like.

The controller 314 captures an image or images 1104. For example, the controller 314 may receive a sensor signal from an initial sensor of the physical shopping cart 300 indicating that there have been one or more items possibly placed into the cart 300. In response, the controller 314 can activate one or more image sensors of the cart 300 to capture one or more images of the image sensor's area and thus possibly a new item being added to the cart or an item being removed from the physical shopping cart 300.

The physical shopping cart 300 can send the image(s) to the facility server 1102 over a data network. For example, a wireless data connection can be created between the controller 314 and the facility server 1102 in order to allow the controller 314 to send the image(s).

The facility server 1102 can submit the image(s) to an image identifier 1106 and receive confidence scores for each possible items 1108. For example, the facility server 1102 can use image recognition to determine a confidence value for each of the possible items. The image recognition can include a process that compares the new image(s) with stored image(s) of the item to determine how similar or different the new image(s) are. If the images are determined to be highly similar, a high confidence score can be returned and if the images are dissimilar, a low confidence score can be returned. Once completed, the facility server 1102 will have generated a list of confidence values with one value for each possible item.

The facility server 1102 determines if a single item can be selected from the possible items 1110. For example, the facility server 1102 can determine if any single item out of the list of possible items has an associated confidence score greater than a threshold value and also greater than all other confidence scores by at least a second threshold value. That is, the facility server 1102 may select an item if that item alone has a high confidence score.

In some cases, the facility server 1102 may determine that two or more items have associated confidence scores that are greater than the threshold and that are similar to each other. In the alternative, the facility server 1102 may determine that none of the items have associated confidence scores that are greater than the threshold value. In such cases, the facility server may select no item.

The facility server 1102 uses the selected item as the identified item 1118. For example, if the facility server 1102 is able to identify an item, the process 1100 can continue with the 1118. For example, if the facility server 1102 is not able to identify he item, the process 1100 can continue to 1112.

If no item is selected, the facility server 1102 decodes barcodes found in the image 1112. For example, the facility server 1102 can identify barcodes such as Universal Product Codes (UPCs), QR codes, databar barcodes, etc that are captured by the image(s). Any barcodes found can be provided to a barcode reading algorithm that extracts alpha-numeric information from the barcode according to the format of the barcode.

The facility server 1102 then compares the extracted alpha-numeric information to data stored for each of the possible items (or all items in the facility). For example, a UPC barcode is read by the facility server 1102 to extract a UPC code, and that extracted UPC code can be compared to all UPC codes stored by the facility server 1102.

If a single item is selected 1114, the facility server 1102 uses the selected item as the identified item 1118. If a single item is not selected 1114, the facility server can perform Object Character Recognition (OCR) on the image(s) 1116. For example, the facility server 443 can analyze the image(s) to identify any alpha-numeric characters shown. These recognized alpha-numeric characters can then be searched in a datastore of alpha-numeric strings associated with each item in the store or each item on the list of possible items in order to identify an item 1118. With all detected barcodes and OCR text analyzed, the facility server 1102 may determine that no item contains the decoded barcode information or OCR text. In such cases, the facility server 1102 may fall back to a 'best guess' of using the item with the highest received 1108 confidence score or take another action such as generating an alert to request user selection.

Figure 12A:
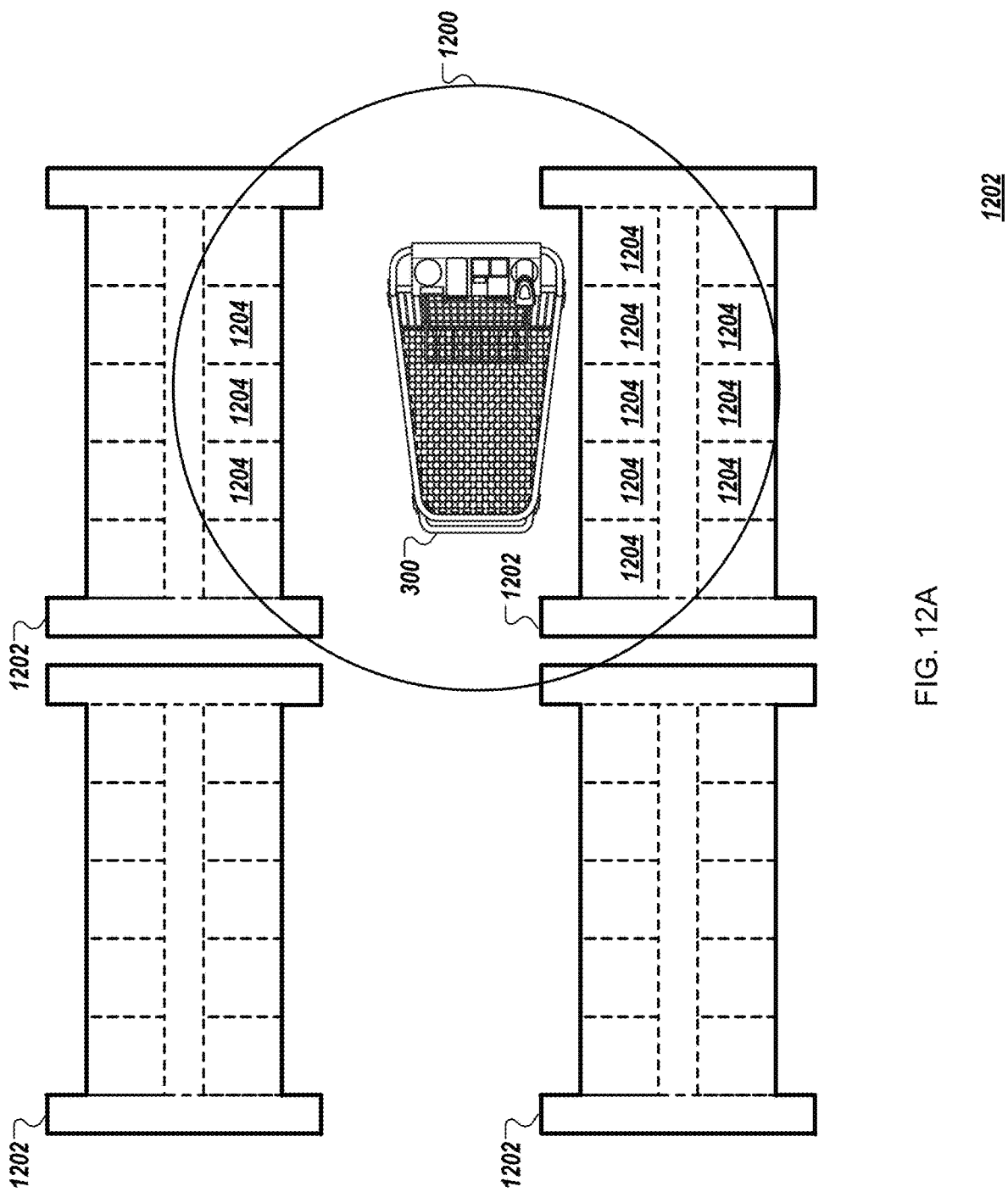
FIG. 12A is a schematic diagram of a shopping cart in a store.

FIG. 12A is a schematic diagram of the shopping cart 300 in a store. As shown here, the store uses shelving units 1202 to organize their items for sale and to provide shoppers with aisles to access items on the shelves for purchase. An area near the cart 1200 can be determined and tracked by elements described in this document, and a collection of in-shelf slots 1204 can be identified that are within the area near the cart 1200

Figure 12B:
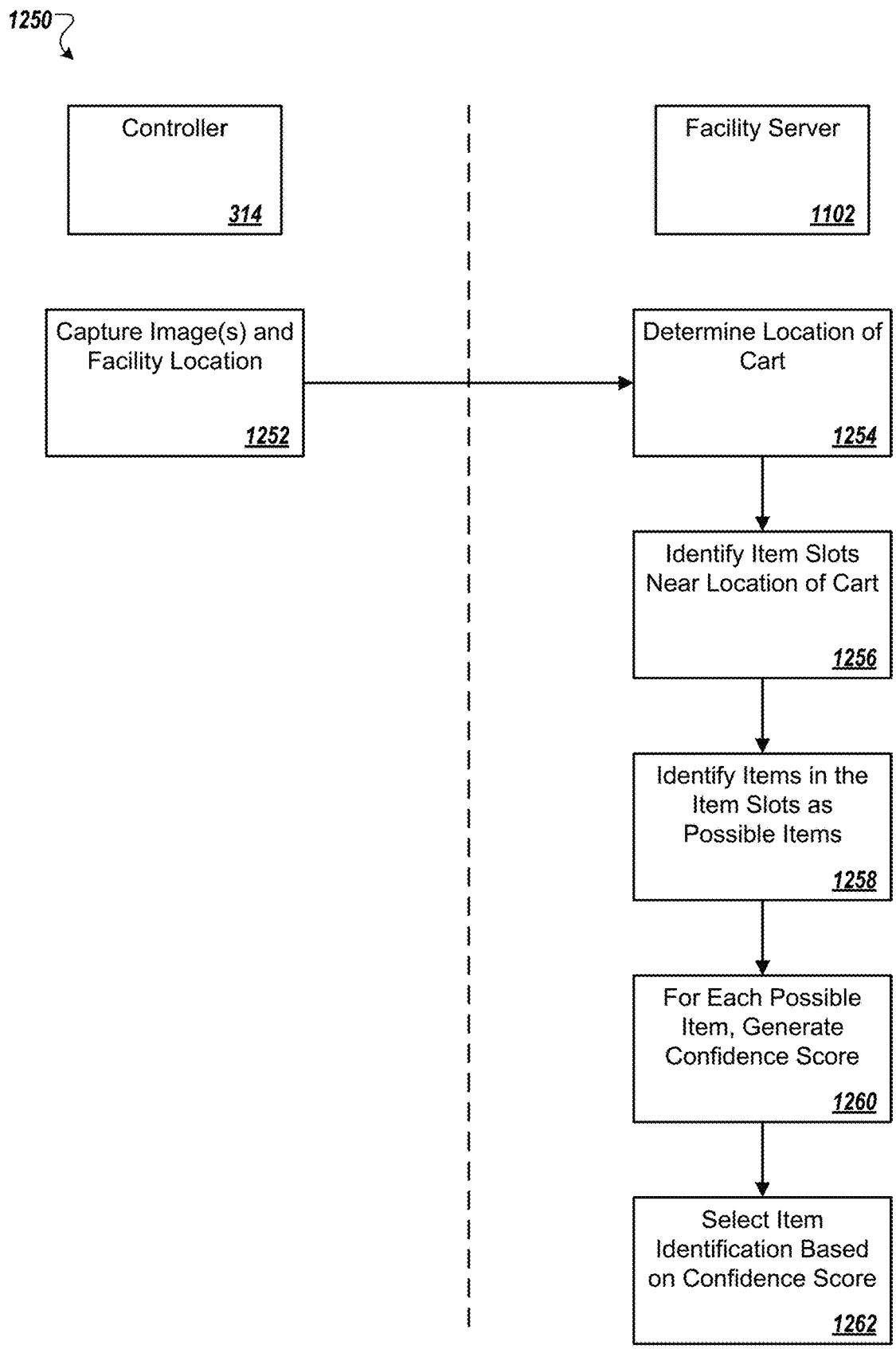
FIG. 12B is a flowchart of an example technique for automatically identifying items placed in a shopping cart.

FIG. 12B is a flowchart of an example technique for automatically identifying items placed in a shopping cart. For example, the process 1250 can be used as part of completing the optical object recognition. The process 1250 can be performed by, for example, the controller 314 working with the facility server 1102.

The controller 314 captures an image or images and facility location 1152. For example, the controller 314 may receive a sensor signal from an initial sensor of the physical shopping cart 300 indicating that there have been one or more items possibly placed into the cart 300. In response, the controller 314 can activate one or more image sensors of the cart 300 to capture one or more images of the image sensor's area and thus possibly a new item being added to the cart or an item being removed from the physical shopping cart 300.

The physical shopping cart 300 can send the image(s) to the facility server 1102 over a data network. For example, a wireless data connection can be created between the controller 314 and the facility server 1102 in order to allow the controller 314 to send the image(s).

In the same or a separate communication, the controller 314 can provide to the facility server 1102 information about the location of the physical shopping cart 300. For example, the facility can place beacons around the facility that each transmit a unique identifier. The facility server 1102 can use these transmissions to determine 1254 the location of the physical shopping cart 300 within the facility. In one example, the strength of each signal from each beacon can be used as a proxy for distance to the beacon, and location within the facility can be determined by triangulating relative to the beacon locations.

The facility server 1102 can identify nearby itemslots in the facility 1256. For example, the facility server can access a datastore that records all items in inventory within a physical store's shelves 1202. Each item may be indexed by location, and the index may be used to prune the list of all possible items to a smaller list of possible items that are near the physical shopping cart's 300 location 1200.

In one example, the index may take the form of a logical tree. The first level of the logical tree may include a department (e.g., home-goods, hardware, sporting goods). Then, each layer of the tree may contain more fine-grain location information. For example, the next layers may be for each aisle, shelf-block, shelf number, and in-shelf slot 1204. One or more of the layers of the tree may then be associated with a location within the store. For example, a planogram in the index may specify which aisle, shelf-block, shelf number, and in-shelf slot each item in the store is located. Then, with the location of the physical shopping cart 300, facility server 1102 can identify all items 1258 within a particular distance from the physical shopping cart 300 location and these items can be used as the list of possible items for the captured image(s) received.

For each possible item, a confidence score is generated 1260. For example, the facility server 1102 can use image recognition to determine a confidence value for each of the possible items. The image recognition can include a process that compares the new image(s) with stored image(s) of the item to determine how similar or different the new image(s) are. If the images are determined to be highly similar, a high confidence score can be returned and if the images are dissimilar, a low confidence score can be returned. Once completed, the facility server 1102 will have generated a list of confidence values with one value for each possible item.

An item identification is selected based on the confidence score 1262. For example, the facility server 1102 may select the highest confidence score as the identified item (i.e. without comparison with a threshold value.) In another example, the facility server 1102 may compare the confidence values to one or more threshold values and may engage in one or more secondary identification processes, as described elsewhere in this document.

What is claimed is:

1. A physical shopping cart is configured to transport physical goods around a store, the physical shopping cart comprising:
   a basket having enclosed sides and an entrance area formed to allow placement of the physical goods into the basket;
   a controller having a processor and memory, the controller being configured to communicably couple to a user-device associated with a user of the physical shopping cart, the user-device configured to maintain a virtual shopping cart with a record of items-of-interest in the physical shopping cart;
   a sensor pod positioned adjacent to an enclosing side, the sensor pod comprising a physical housing that encloses:
      gesture sensor positioned within the pod to detect possible-items passing through a sensor plane in the entrance area; and
      a secondary sensor positioned to collected data from an area in the basket to determine if possible-items detected by the gesture sensor is are items-of-interest;
   wherein the physical shopping cart is configured to:
      maintain the secondary sensor in a low-power state;
      sense, based on data from the gesture sensor, a possible-item passing through the sensor plane and into the basket;
      responsive to sensing a possible-item passing through the sensor plane, activate the secondary sensor out of the low-power state and determine if the possible-item is an item-of-interest; and
      responsive to determining that the possible-item is an item of interest, transmit a sense-message that identifies the item-of-interest; and
   wherein the controller is further configured to:
      receive the sense-message; and
      send, to the user-device, an update-message containing information about the item-of-interest to be added to the virtual shopping cart.

2. The physical shopping cart of claim 1, wherein the secondary sensor is a vision sensor configured to capture images.

3. The physical shopping cart of claim 1, wherein the physical shopping cart further comprises an RFID sensor, and wherein the physical shopping cart is further configured to:
   sense a second item-of-interest with the RFID sensor; and
   responsive to sensing the second item-of-interest with the RFID sensor, transmit a second sense-message that identifies the second item-of-interest.

4. The physical shopping cart of claim 1, wherein the secondary sensor is a RFID sensor.

5. The physical shopping cart of claim 1, wherein the physical shopping cart further comprises a mounting fixture into which the user can removably mount the user-device.

6. A system comprising the physical shopping cart and the user-device of claim 1.

7. The physical shopping cart of claim 1, wherein the physical shopping cart is further configured to transmit a location of the physical shopping cart.

8. The physical shopping cart of claim 1, wherein the physical shopping cart is further configured to, responsive to sensing a possible-item placed into the physical shopping cart, activate a second secondary sensor out of a low-power state and determine if the possible-item is an item-of-interest while the secondary sensor is also activated out of the low-power state.

9. A system comprising the physical shopping cart of claim 1, the system further comprising:
   a facility server configured to:
      receive the sense-message that identifies the item-of-interest; and
      identify the item-of-interest based on the received sense-message.

10. The system of claim 9, wherein:
    the physical shopping cart is further configured to transmit a location of the physical shopping cart; and
    the facility server is further configured to identify the item-of-interest based on the received sense-message using the location of the physical shopping cart.

11. The system of claim 10, wherein the facility server is further configured to identify the item-of-interest based on the received sense-message using the location of the physical shopping cart by:
    generating, out of a list of possible items in the facility, a list of possible items near the physical shopping cart.

12. The system of claim 9, wherein the facility server is further configured to:
    generate a plurality of confidence values; and
    identify the item-of-interest based on the received sense-message by determining that a confidence value associated with the item-of-interest is greater than a first threshold value.

13. The system of claim 12, wherein the facility server is further configured to identify the item-of-interest based on the received sense-message by determining that a confidence value associated with the item-of-interest is greater than other confidence values by a second threshold value.

14. The physical shopping cart of claim 1, wherein:
    the entrance area is defined, at least in part, by an upper perimeter of the enclosed sides, and
    the sensor pod is affixed to the upper perimeter of the enclosed sides with a field of view directed across the entrance area and defining the sensor plane.

15. The physical shopping cart of claim 1, further comprising:
    an auxiliary area defining an additional and physically separate enclosed space and entrance to allow for placement of the physical goods into the auxiliary area; and
    an additional sensor pod positioned to detect the placement and remove of the physical goods into the auxiliary area.

16. The physical shopping cart of claim 1, further comprising:
    an undercart area defining an additional and physically separate space that is positioned below the basket and to allow for placement of the physical goods into the undercart area; and
    an additional sensor pod positioned to detect the placement and remove of the physical goods into the undercart area.

17. The physical shopping cart of claim 1, further comprising:
    an additional sensor pod positioned adjacent to the enclosing side to additionally detect the placement and remove of the physical goods into the basket.

18. A physical shopping cart is configured to transport physical goods around a store, the physical shopping cart comprising:

a controller having a processor and memory, the controller being configured to communicably couple to a user-device associated with a user of the physical shopping cart, the user-device configured to maintain a virtual shopping cart with a record of items-of- interest in the physical shopping cart;

a basket having enclosed sides and an entrance area formed to allow placement of the physical goods into the basket;

means for to detecting possible-items passing through a sensor plane in the entrance area; and a secondary sensor positioned adjacent to an enclosing side, configured to determine if possible-items detected by the initial sensor is are items-of-interest;

wherein the physical shopping cart is configured to:
maintain the secondary sensor in a low-power state;
sense, based on data from the gesture sensor, a possible-item passing through the sensor plane and into the basket;
responsive to sensing a possible-item passing through the sensor plane, activate the secondary sensor out of the low-power state and determine if the possible-item is an item-of-interest; and
responsive to determining that the possible-item is an item of interest, transmit a sense-message that identifies the item-of-interest; and wherein the controller is further configured to:
receive the sense-message; and
send, to the user-device, an update-message containing information about the item-of-interest to be added to the virtual shopping cart.

19. The physical shopping cart of claim 18, the physical shopping cart further comprising means for storing items placed into the physical shopping cart.

20. The physical shopping cart of claim 19, the physical shopping cart further comprising second means for detecting possible-items placed into the physical shopping cart.

* * * * *